(12) United States Patent
Zhang et al.

(10) Patent No.: US 12,255,468 B2
(45) Date of Patent: Mar. 18, 2025

(54) ELECTROMAGNETIC SHIELD DESIGNS FOR HIGH POWER WIRELESS CHARGING OF ELECTRIC VEHICLES AND RELATED SHIELDS, VEHICLES, SYSTEMS, AND METHODS

(71) Applicant: Battelle Energy Alliance, LLC, Idaho Falls, ID (US)

(72) Inventors: Bo Zhang, Salt Lake City, UT (US); Richard W. Carlson, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 68 days.

(21) Appl. No.: 17/753,536

(22) PCT Filed: Sep. 3, 2020

(86) PCT No.: PCT/US2020/049167
§ 371 (c)(1),
(2) Date: Mar. 7, 2022

(87) PCT Pub. No.: WO2021/050350
PCT Pub. Date: Mar. 18, 2021

(65) Prior Publication Data
US 2022/0385115 A1    Dec. 1, 2022

Related U.S. Application Data

(60) Provisional application No. 62/898,784, filed on Sep. 11, 2019.

(51) Int. Cl.
*H01F 27/36* (2006.01)
*B60L 53/12* (2019.01)
(Continued)

(52) U.S. Cl.
CPC .............. *H02J 50/70* (2016.02); *B60L 53/12* (2019.02); *B60L 53/30* (2019.02); *H01F 27/36* (2013.01);
(Continued)

(58) Field of Classification Search
CPC ...... H01F 27/36; H01F 27/346; H01F 27/361; H01F 27/363; H01F 27/366; H01F 38/14
See application file for complete search history.

(56) References Cited

U.S. PATENT DOCUMENTS

| 8,008,888 B2 | 8/2011 | Oyobe et al. |
| 8,946,938 B2 | 2/2015 | Kesler et al. |

(Continued)

FOREIGN PATENT DOCUMENTS

| EP | 3282459 A1 | 2/2018 |
| GB | 2497824 A | 6/2013 |
| WO | 2011/046374 A2 | 4/2011 |

OTHER PUBLICATIONS

Choi et al., "Generalized Active EMF Cancel Methods for Wireless Electric Vehicles," IEEE Transaction on Power Electronics, vol. 29, Issue 11, Nov. 2014, pp. 5770-5783.

(Continued)

*Primary Examiner* — Mang Tin Bik Lian
(74) *Attorney, Agent, or Firm* — TraskBritt

(57) ABSTRACT

Electromagnetic shields, vehicles, wireless charging systems, and related methods are disclosed. An electromagnetic shield includes a shield member including a coil side to face one or more inductive coils. The electromagnetic shield also includes one or more perimeter shield members configured in a loop proximate to a perimeter of the coil side of the shield member. The shield member and the one or more (Continued)

perimeter shield members are configured to shield electromagnetic radiation emitted by the one or more inductive coils.

9 Claims, 13 Drawing Sheets

(51) Int. Cl.
    *B60L 53/30*     (2019.01)
    *H02J 50/00*     (2016.01)
    *H02J 50/10*     (2016.01)
    *H02J 50/40*     (2016.01)
    *H02J 50/70*     (2016.01)

(52) U.S. Cl.
    CPC ............ *H02J 50/005* (2020.01); *H02J 50/10* (2016.02); *H02J 50/40* (2016.02); *H02J 2310/48* (2020.01)

(56) References Cited

U.S. PATENT DOCUMENTS

| | | | |
|---|---|---|---|
| 9,306,635 B2 | 4/2016 | Kurs et al. | |
| 9,707,852 B2 | 7/2017 | Kautz | |
| 9,735,606 B2 * | 8/2017 | Koyanagi | H02J 50/70 |
| 9,923,406 B2 | 3/2018 | Percebon et al. | |
| 10,080,318 B2 | 9/2018 | Ricci | |
| 10,128,698 B2 | 11/2018 | Lewis et al. | |
| 10,245,963 B2 | 4/2019 | Ansari et al. | |
| 2010/0081483 A1 | 4/2010 | Chatterjee et al. | |
| 2012/0262002 A1 | 10/2012 | Widmer et al. | |
| 2013/0119928 A1 | 5/2013 | Partovi | |
| 2013/0154553 A1 | 6/2013 | Steele | |
| 2015/0145341 A1 | 5/2015 | Chiyo et al. | |
| 2015/0244181 A1 * | 8/2015 | Kagami | H01F 27/361 307/104 |
| 2015/0246614 A1 | 9/2015 | Dames et al. | |
| 2015/0371768 A1 * | 12/2015 | Graham | H01F 1/147 320/108 |
| 2015/0380154 A1 * | 12/2015 | Kagami | H02J 50/12 336/220 |
| 2016/0020019 A1 * | 1/2016 | Kagami | H02J 50/70 307/104 |
| 2016/0052398 A1 | 2/2016 | Richards | |
| 2016/0068070 A1 | 3/2016 | Huang et al. | |
| 2016/0144727 A1 | 5/2016 | Tokura et al. | |
| 2016/0285317 A1 | 9/2016 | Maniktala | |
| 2016/0347188 A1 * | 12/2016 | Nakahara | H02J 50/12 |
| 2016/0380469 A1 | 12/2016 | Lethellier et al. | |
| 2017/0126059 A1 | 5/2017 | Takahashi et al. | |
| 2017/0136896 A1 | 5/2017 | Ricci | |
| 2017/0222490 A1 | 8/2017 | Boys et al. | |
| 2018/0040416 A1 | 2/2018 | Lestoquoy | |
| 2018/0090956 A1 | 3/2018 | Graham et al. | |
| 2018/0090974 A1 | 3/2018 | Elkayam et al. | |
| 2018/0294683 A1 * | 10/2018 | Sakamoto | B60L 53/124 |
| 2019/0035543 A1 * | 1/2019 | Suzuki | H01F 27/40 |
| 2019/0190317 A1 * | 6/2019 | Wang | H02J 50/10 |
| 2020/0126717 A1 * | 4/2020 | Nakamura | H02J 50/12 |

OTHER PUBLICATIONS

International Search Report for Application No. PCT/US2020/049167, mailed Jan. 22, 2021, 4 pages.
Written Opinion of the International Searching Authority for Application No. PCT/US2020/049167, mailed Jan. 22, 2021, 5 pages.
Zhang et al., "Concept Design of Active Shielding for Dynamic Wireless Charging of Light-duty EV," 2020 IEEE Transportation Electrification Conference & Expo (ITEC), Chicago, IL, USA, 2020, pp. 844-850, doi: 10.1109/ITEC48692.2020.9161606.

* cited by examiner

ELECTROMAGNETIC SHIELD DESIGNS FOR HIGH POWER WIRELESS CHARGING OF ELECTRIC VEHICLES AND RELATED SHIELDS, VEHICLES, SYSTEMS, AND METHODS

CROSS-REFERENCE TO RELATED APPLICATIONS

This application is a national phase entry under 35. U.S.C. § 371 of International Patent Application PCT/US2020/049167, filed Sep. 3, 2020, designating the United States of America and published as International Patent Publication WO 2021/050350 A1 on Mar. 18, 2021, which claims the benefit under Article 8 of the Patent Cooperation Treaty to U.S. Provisional Patent Application Ser. No. 62/898,784, filed Sep. 11, 2019, for "Electromagnetic Shield Design for High Power Wireless Charging of Electric Vehicles and Related Systems, Devices, and Methods," the entire disclosure of which is hereby incorporated herein by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The present disclosure relates, generally, to electromagnetic (EM) shields for high-power wireless charging, and more specifically to EM shielding for high-power wireless charging of electric vehicles.

BACKGROUND

Wireless power transfer (WPT) or inductive power transfer (IPT) promises convenient, autonomous, and highly efficient charging of electric vehicles. As the WPT power goes up, electromagnetic safety surrounding the WPT becomes a critical concern for both human health and environment protection. In order to protect human health and environmental safety, the Society of Automotive Engineers (SAE) provides standards for regulating electromagnetic (EM) fields and safety for wireless charging of vehicles. For example, the SAE J2954 specification requires that at 0.8 meters from the center of an inductive coil, the magnetic field must be at or below 27 micro Tesla (27 µT). Conventional shielding technology may be sufficient to comply with this standard for WPT with power levels lower than twenty-two kilo Watts (22 kW). For higher power levels (e.g., 100 kW to 200 kW or higher), however, electromagnetic safety becomes a challenge.

BRIEF SUMMARY

In some embodiments an electromagnetic shield includes a shield member and one or more perimeter shield members. The shield member includes a coil side configured to face one or more inductive coils and one or more perimeter shield members configured in a loop proximate to a perimeter of the coil side of the shield member. The shield member and the one or more perimeter shield members are configured to shield electromagnetic radiation emitted by the one or more inductive coils.

In some embodiments a vehicle includes a vehicle coil assembly, one or more vehicle inductive coils, a vehicle shield member, and one or more vehicle perimeter shield members. The vehicle coil assembly is attached to an underside of the vehicle. The vehicle coil assembly includes one or more vehicle inductive coils configured to receive wireless power from one or more source inductive coils of a source coil assembly. The vehicle shield member is between the one or more vehicle inductive coils and the underside of the vehicle. The one or more vehicle perimeter shield members are configured in a loop proximate to a perimeter of the vehicle shield member and proximate to a source coil side of the vehicle shield member.

In some embodiments a wireless charging system includes a source coil assembly configured to wirelessly provide power to a vehicle coil assembly of a vehicle. The source coil assembly includes a source shield member including a source coil side and a ground side opposite the source coil side and one or more source perimeter shield members proximate to a perimeter of the source coil side of the source shield member.

In some embodiments a method of shielding an inductive coil includes positioning a shield member adjacent an inductive coil with the inductive coil proximate to a coil side of the shield member. The method also includes positioning one or more perimeter shield members extending from the coil side of the shield member proximate to a perimeter of the shield member.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
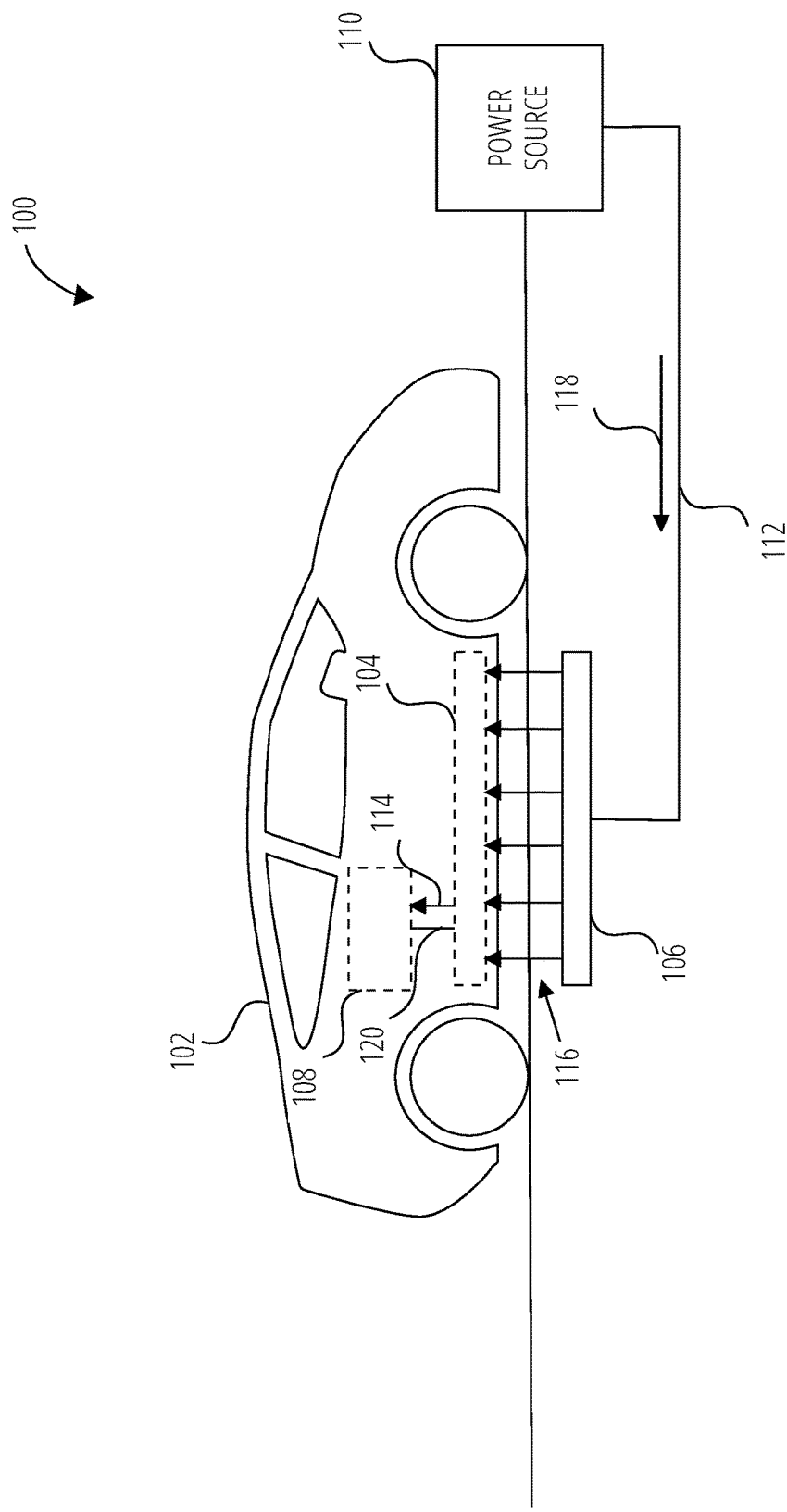
FIG. 1 is a side-view of a wireless charging system according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "vehicle" may refer to any type of vehicle such as an automobile, a truck, a bus, a ship, and/or an aircraft.

Commercially available WPT devices tend to operate at 11 kW or lower power. Conventional shielding techniques may be sufficient to handle up to about 22 kW WPT, but as a demand for higher power (e.g., greater than about 22 kW, 100 kW, 200 kW, etc.) wireless charging grows, conventional shielding techniques will be insufficient to handle the high-power electromagnetic fields inherent to higher power WPT. Since high-power wireless charging generates a powerful electromagnetic field, human health and environmental safety are of concern.

SAE recommended practice J2954 entitled "Wireless Power Transfer for Light-Duty Plug-In/Electric Vehicles and Alignment Methodology" defines the electromagnetic field (EM) emission regions for light duty electric vehicles (LDEVs). Magnetic and electric fields on boundaries between a region beneath the vehicle and a region to a lateral side of the vehicle should comply with International Commission on Non-Ionizing Radiation Protection Guidelines 2010 (ICNIRP 2010). For LDEVs, the distance from boundaries to the coupler center is defined as 0.8 m, which is derived from the width of a 1.6 meter (m) wide compact LDEV. The direction for these criteria is along a direction that is horizontal and perpendicular to a forward direction of travel of the vehicle. Magnetic field simulation plots (e.g., FIGS. 4, 5, 9, and 10) of magnetic field magnitudes versus distance to the center of coils are taken along this horizontal direction that is perpendicular to the forward direction of travel of the vehicle.

ICNIRP 2010 defines the permitted exposure for both electric and magnetic fields. For WPT in the frequency range between 3 kHz and 100 kHz, allowed exposure level is 27 microtesla ($\mu$T) for magnetic field and 83 volts per meter (V/m) for electric field. For 25 kilowatt (kW) WPT an electric field generated by WPT is typically less than 10% of the required limit of 83 V/m. Accordingly, the 83 V/m limit is not of great concern. Magnetic field emission with 100 kW or higher power may, however, already exceed the magnetic field limitation of 27 $\mu$T if no further field shielding method is utilized.

To ensure EM safety, magnetic field emission resulting from wireless charging should be considered. The magnetic field emission should comply with recommended practice SAE J2954 (0.8 m distance criteria) and ICNIRP 2010 (27 $\mu$T magnetic field criteria), respectively.

Misalignment between source coils and vehicle coils is another issue addressed by some embodiments disclosed herein. Misalignment makes EM safety issues even more challenging. SAE J2954 defines the allowed maximum misalignments between source coils and vehicle coils, which should be no more than 75 mm in a direction that is parallel to forward direction of the vehicle and no more than 100 mm in a direction that is horizontal and perpendicular to the forward direction of the vehicle.

Integrating shielding into a WPT system leads to changes in the self-inductances and the mutual inductance. To ensure a sufficient power factor, compensation capacitors on both ground and vehicle sides should be re-tuned after shielding is integrated. For light-duty EV application, weight and size of shielding members should also be reduced for a compact coil design.

Disclosed herein are electromagnetic shields that shape electromagnetic fields and centralize field distributions to increase magnetic field density near a center of a coil and decrease magnetic field leakage at 0.8 m from the center of the coil.

Disclosed herein are electromagnetic shields, systems and vehicles that use electromagnetic shields, and related methods that are suitable for wireless charging at high power levels (e.g., greater than about 22 kW, 100 kW, 200 kW, etc.). In some embodiments disclosed herein is an intermittent horizontal shielding design, which may reduce EM field emissions to acceptable levels (e.g., levels required by SAE J2954). Embodiments disclosed herein may reduce EM field emissions by about 50% as compared with conventional WPT solutions. These embodiments may be tolerant to misalignment between source coils and vehicle coils, increase self-inductance and mutual-inductance as compared to conventional WPT solutions, and be lightweight (which may be useful for on-vehicle shielding).

In some embodiments an electromagnetic shield includes a shield member and one or more perimeter shield members. The shield member includes a coil side configured to face one or more inductive coils. The one or more perimeter shield members are configured in a loop proximate to a perimeter of the coil side of the shield member. The shield member and the one or more perimeter shield members are configured to shield electromagnetic radiation emitted by the one or more inductive coils. In some embodiments the electromagnetic shield also includes a source shield member and one or more source perimeter shield members. The source shield member includes a source coil side configured to face source inductive coils. The one or more source perimeter shield members are configured in a loop around a perimeter of the source coil side of the source shield member. The source shield member and the one or more source perimeter shield members are configured to shield electromagnetic radiation emitted by the one or more source inductive coils.

In some embodiments a vehicle includes a vehicle coil assembly attached to an underside of the vehicle. The vehicle coil assembly includes one or more vehicle inductive coils, a vehicle shield member, and one or more vehicle perimeter shield members. The one or more vehicle inductive coils are configured to receive wireless power from one or more source inductive coils of a source coil assembly. The vehicle shield member is between the one or more vehicle inductive coils and the underside of the vehicle. The one or more vehicle perimeter shield members are arranged in a loop proximate to a perimeter of the vehicle shield member and proximate to a source coil side of the vehicle shield member.

In some embodiments a wireless charging system includes a source coil assembly configured to wirelessly provide power to a vehicle coil assembly of a vehicle. The source coil assembly includes a source shield member and one or more source perimeter shield members. The source shield member includes a source coil side and a ground side opposite the source coil side. The one or more source perimeter shield members are proximate a perimeter of the source coil side of the source shield member.

In some embodiments a method of shielding an inductive coil includes positioning a shield member adjacent an inductive coil with the inductive coil proximate to a coil side of the shield member. The method also includes positioning one or more perimeter shield members extending from the coil side of the shield member proximate to a perimeter of the shield member.

In some embodiments a method of wirelessly charging a vehicle includes conducting, using one or more source electrical cables, electrical power from a power source to one or more source inductive coils of a source coil assembly positioned beneath a vehicle. The method also includes radiating wireless power from the one or more source inductive coils to one or more vehicle inductive coils of a vehicle coil assembly attached to an underside of the vehicle. The method further includes shielding the one or more source inductive coils with a source shield member and one or more source perimeter shield members. The one or more source perimeter shield members are configured about a perimeter of the source shield member on a top side of the source shield member. The method also includes receiving the wireless power radiated from the one or more source inductive coils with one or more vehicle inductive coils. The method further includes shielding the one or more vehicle inductive coils with a vehicle shield member and one or more vehicle perimeter shield members. The one or more vehicle perimeter shield members are configured about a perimeter of the vehicle shield member under a bottom side of the vehicle shield member. The method additionally includes conducting power from the one or more vehicle inductive coils to an energy storage system of the vehicle using one or more vehicle electrical cables.

FIG. 1 is a side-view of a wireless charging system 100 according to some embodiments. The wireless charging system 100 includes a vehicle 102, a source coil assembly 106, and a power source 110 operably coupled to the source coil assembly 106. The source coil assembly 106 may be located on or in the ground so that the vehicle 102 may be parked over the source coil assembly 106 to enable wireless charging. The vehicle 102 includes a vehicle coil assembly 104 configured to inductively couple to the source coil assembly 106 to receive wireless power 116 from the source coil assembly 106. The vehicle 102 also includes an energy storage system 108 configured to be charged using the wireless power 116 received from the source coil assembly 106 by the vehicle coil assembly 104.

The power source 110 is configured to provide electrical power 118 (e.g., a grid side electric energy) to the source coil assembly 106. The source coil assembly 106 is operably coupled to the power source 110 by one or more source electrical cables 112, which conduct the electrical power 118 to the source coil assembly 106 from the power source 110. The source coil assembly 106 includes one or more inductive coils configured to convert the electrical power 118 received from the power source 110 to wireless power 116 (electromagnetic energy including three dimensional magnetic fields generated by the source coil assembly).

The vehicle coil assembly 104 also includes one or more inductive coils configured to convert the wireless power 116 to power 114 (e.g., electrical power). The inductive coils of the source coil assembly 106 and the vehicle coil assembly 104 emit EM fields. In order to contain EM fields emitted by the one or more inductive coils, the source coil assembly 106 and the vehicle coil assembly 104 include electromagnetic shield members. More detail regarding these electromagnetic shield members will be discussed below with reference to FIG. 2, FIG. 6, FIG. 7, FIG. 8, FIG. 11, and FIG. 12.

The vehicle coil assembly 104 is configured to provide the power 114 to the energy storage system 108. The vehicle 102 includes one or more vehicle electrical cables 120 operably coupling the vehicle coil assembly 104 to the energy storage system 108 to deliver the power 114 from the vehicle coil assembly 104 to the energy storage system 108. In some embodiments the energy storage system 108 includes one or more batteries (e.g., rechargeable batteries) such as lithium-ion batteries, lead acid batteries, nickel metal hydride batteries, other batteries, or combinations thereof. In some embodiments the energy storage system 108 includes circuitry to control charging of energy storage elements within the energy storage system 108.

In operation, the vehicle 102 is positioned over the source coil assembly 106 and the power source 110 provides the electrical power 118 through the source electrical cables 112 to the source coil assembly 106. The source coil assembly 106 receives the electrical power 118 and converts the electrical power 118 to wireless power 116, which radiates to the vehicle coil assembly 104. The vehicle coil assembly 104 converts the wireless power 116 to power 114 and provides the power 114 to the energy storage system 108 through the vehicle electrical cables 120. The energy storage system 108 receives the power 114 and uses the power 114 to charge itself.

Figure 2:
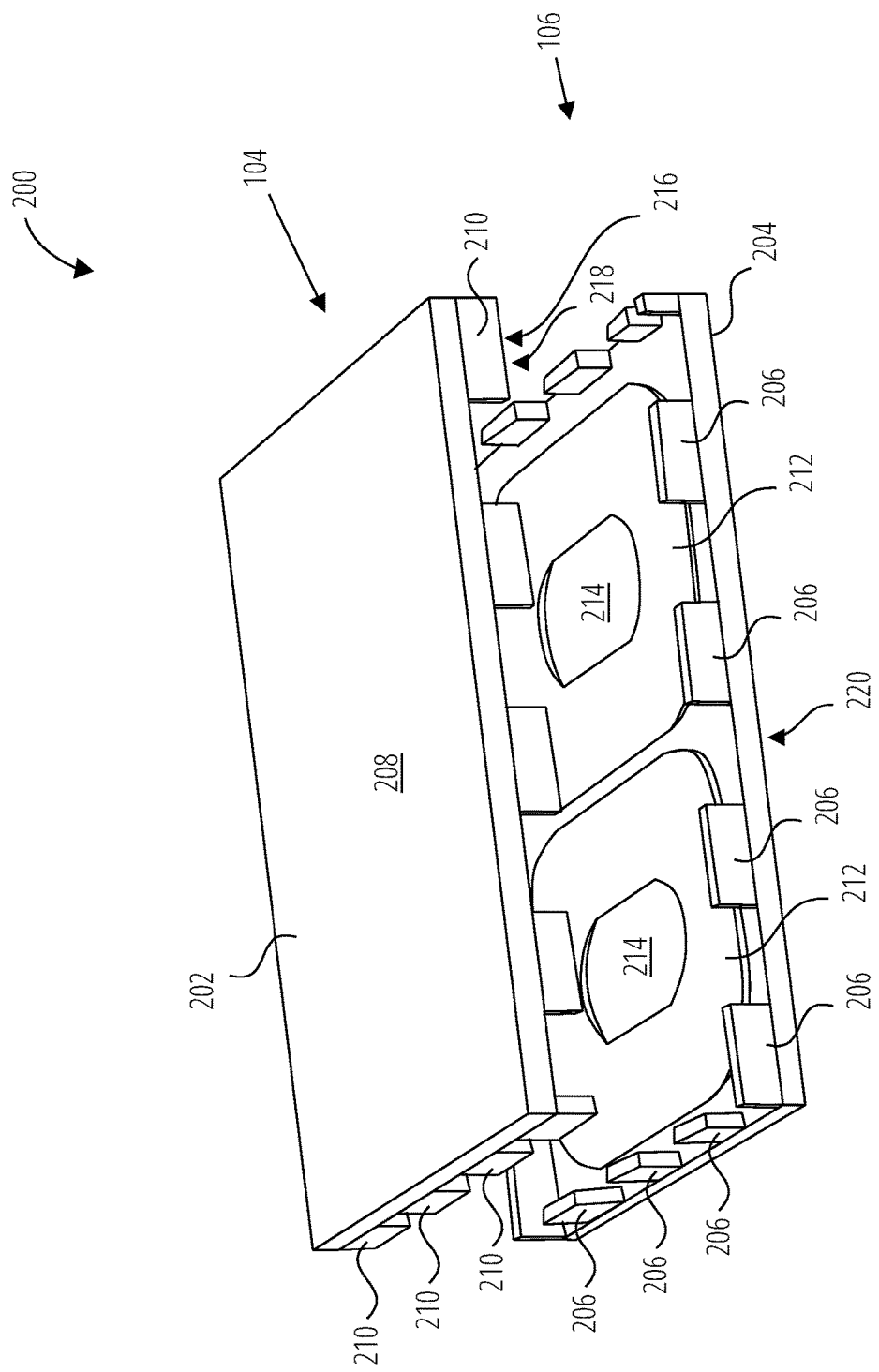
FIG. 2 is a perspective view of an electromagnetic shield of the wireless charging system of FIG. 1.

FIG. 2 is a perspective view of an example of an electromagnetic shield 200 of the wireless charging system 100 of FIG. 1. The electromagnetic shield 200 includes examples of the vehicle coil assembly 104 and the source coil assembly 106 of FIG. 1. The vehicle coil assembly 104 includes a vehicle shield member 202 and vehicle perimeter shield members 210. The vehicle shield member 202 includes a vehicle side 208 (e.g., facing the underside of the vehicle 102 of FIG. 1) and a vehicle coil side 216 (e.g., facing one or more vehicle inductive coils 218) opposite the vehicle side 208. The vehicle perimeter shield members 210 are distributed discontinuously around an outer perimeter of the vehicle coil side 216 of the vehicle shield member 202.

The source coil assembly 106 includes a source shield member 204 and source perimeter shield members 206. The source shield member 204 includes a ground side 220 (e.g., facing the ground if the source coil assembly 106 is placed on the ground or facing further underground if the source coil assembly 106 is placed within the ground) and a source coil side 214 (e.g., facing one or more source inductive coils 212) opposite the ground side 220. With the vehicle coil assembly 104 aligned with the source coil assembly 106, the vehicle coil side 216 of the vehicle shield member 202 faces the source coil side 214 of the source shield member 204. The source perimeter shield members 206 are distributed discontinuously around an outer perimeter of the source coil side 214 of the source shield member 204.

In some embodiments, the vehicle shield member 202, the source shield member 204, or both, include magnetically permeable material. By way of non-limiting example, the vehicle shield member 202, the source shield member 204, or both include aluminum, ferrite, or both. 3C95 Ferrite from Ferroxcube may be used due to its high resistance (e.g., about 5 Ω·m) to mitigate eddy current losses and its high relevant permeability (e.g., about 3000 at 25° Celsius). In some embodiments the vehicle perimeter shield members 210, the source perimeter shield members 206, or both also include magnetically permeable material. By way of non-limiting example, the vehicle perimeter shield members 210, the source perimeter shield members 206, or both include a ferrite material. Also, by way of non-limiting example, the vehicle perimeter shield members 210, the source perimeter shield members 206, or both include a material having a relative magnetic permeability of greater than or equal to 2000. As a further non-limiting example, the vehicle perimeter shield members 210, the source perimeter shield members 206 or both include a material having a relative magnetic permeability of about 3000 to about 4000. As used herein, the term "relative magnetic permeability" refers to a ratio between the magnetic permeability of a specific medium (e.g., sometimes measured in Henries per meter) and the magnetic permeability of free space (which is about four times pi (3.14159 . . . ) times ten to the negative seventh power Henries per meter). As another non-limiting example, the source perimeter shield members 206 and/or the vehicle perimeter shield members 210 may form a discontinuous loop around a perimeter of the coil side of the source shield member 204 and/or the vehicle shield member 202, and the source perimeter shield members 206 and/or the vehicle perimeter shield members 210 may include standalone or mixed non-ferrite materials having relatively high electrical resistances and having a relative magnetic permeability of about 2000 or greater. The vehicle shield member 202, the source shield member 204, the vehicle perimeter shield members 210, and the source perimeter shield members 206 may include magnetically permeable materials in solid form, in hollow mesh form, or in mesh form suspended in a different medium (e.g., a lightweight medium). A mesh of a magnetically permeable material may be sufficient to serve as a shield material if spaces in the mesh have dimensions that are smaller than wavelengths corresponding to powerfully energized frequencies of the wireless power 116 (e.g., wavelengths associated with 60 Hz power, the first few integer multiples of 60 Hz, etc.).

The magnetically permeable properties of the electromagnetic shield 200 enable the electromagnetic shield 200 to shield the vehicle inductive coils 218 and the source inductive coils 212. For example, the vehicle shield member 202 and the source shield member 204 contribute largely to shielding the vehicle inductive coils 218 and the source inductive coils 212 in a vertical direction from the vehicle inductive coils 218 and the source inductive coils 212. Drawing an analogy to a hamburger, the buns contain the contents of the hamburger in the vertical direction as the vehicle shield member 202 and the source shield member 204 contain the EM fields in the vertical direction. A hamburger, however, does not provide a physical barrier to contain the contents of the hamburger in a horizontal direction. In the electromagnetic shield 200, however, the vehicle perimeter shield members 210 and the source perimeter shield members 206 contribute largely to shielding the vehicle inductive coils 218 and the source inductive coils 212 in a horizontal direction. The vehicle perimeter shield members 210 and the source perimeter shield members 206 may centralize fields near the coils (the source inductive coils 212 and the vehicle inductive coils 218) and reduce emissions.

As previously discussed, in the example shown in FIG. 2, the vehicle perimeter shield members 210 and the source perimeter shield members 206 are intermittently, in contrast to continuously, spaced around the perimeters of the vehicle shield member 202 and the source shield member 204, respectively. Although a greater level of shielding may be achieved by instead employing a constant perimeter shield member around each of the perimeters of the vehicle shield member 202 and the source shield member 204 (see FIG. 7), such a constant horizontal shield may cause undesired eddy currents. These eddy currents may ultimately reduce the efficiency of the inductive coupling between the vehicle inductive coils 218 and the source inductive coils 212. The use of discontinuous loops formed by the vehicle perimeter shield members 210 and the source perimeter shield members 206, though less effective at shielding than continuous loops, provides an acceptable balance between shielding effectiveness and coupling efficiency between the vehicle inductive coils 218 and the source inductive coils 212. Another benefit afforded by the intermittent spacing of the vehicle perimeter shield members 210 and the source perimeter shield members 206 is that a total weight of an intermittently spaced device is less than a total weight of a continuous device.

In some embodiments at least some of the vehicle perimeter shield members 210 or the source perimeter shield members 206 are rectangle shaped, as illustrated in FIG. 2. In some embodiments, however, the vehicle perimeter shield members 210 and the source perimeter shield members 206 may take on any of a variety of different shapes including triangular, circular, semi-circular, square, other polygonal, irregular, other shapes, or any combination thereof.

In some embodiments the vehicle perimeter shield members 210 are misaligned with the source perimeter shield members 206 such that the vehicle perimeter shield members 210 are in an interleaved arrangement relative to the source perimeter shield members 206, as illustrated in FIG. 2. It should be understood, however, that a variety of different alignments of the vehicle perimeter shield members 210 with respect to the source perimeter shield members 206 may be used without departing from embodiments disclosed herein. For example, the vehicle perimeter shield members 210 may be aligned with the source perimeter shield members 206. Also, in some embodiments the vehicle perimeter shield members 210 and the source perimeter shield members 206 may be uniformly spaced around the perimeters of the vehicle shield member 202 and the source shield member 204, respectively. In some embodiments, irregular or non-uniform spacing may be used. Furthermore, either similar or different spacing may be used in the vehicle perimeter shield members 210 as in the source perimeter shield members 206.

Dimensions (e.g., width, height, thickness) of the source perimeter shield members 206 and the vehicle perimeter shield members 210 may be varied, according to various embodiments. For example, FIG. 6 (discussed in more detail below) illustrates another electromagnetic shield 600 including perimeter shield members (source perimeter shield members 606 and vehicle perimeter shield members 610) that have narrower width and are spaced a smaller distance apart, as compared to those of the electromagnetic shield 200 of FIG. 2. It is noted that simulations suggest that increasing the thickness of the source and vehicle perimeter shield members 206, 210 decreases the magnetic field around the electromagnetic shield 200 while decreasing the thickness of the source and vehicle perimeter shield members 206, 210 increases the magnetic field around the electromagnetic shield members 206, 210.

It is noted that the use of vehicle perimeter shield members 210 and source perimeter shield members 206 may reduce a magnetic distance between the source coil assembly 106 and the vehicle coil assembly 104. Therefore, to reduce the impact on reducing magnetic distance, the height of teeth may be carefully selected. By way of non-limiting example, 38×25×3.8-millimeter (mm) ferrite plates may be selected for the vehicle perimeter shield members 210 and source perimeter shield members 206. Assuming the original air gap between the source shield member 204 and the vehicle shield member 202 is about 125 mm, the magnetic distance is reduced from 125 mm to about 97.4 mm assuming a coil diameter of 11.2 mm with the vehicle perimeter shield members 210 and the source perimeter shield members 206.

In various embodiments, any number, arrangement, or shape of inductive coils may be used in the vehicle inductive coils 218 and the source inductive coils 212. In the example shown in FIG. 2, the vehicle inductive coils 218 and the source inductive coils 212 are double D coils (e.g., a pair of coils each resembling a capital letter "D"). It should be understood that a single coil or more than two coils may be used in each of the vehicle inductive coils 218 and the source inductive coils 212. Also, the coils may take any shape (e.g., circular, rounded rectangular, oval, racetrack shape, etc.). By way of non-limiting example, 2 American wire gauge (AWG) Litz wires may be utilized to wire single layer DD coil with a wire diameter of 11.2 mm.

Figure 3:
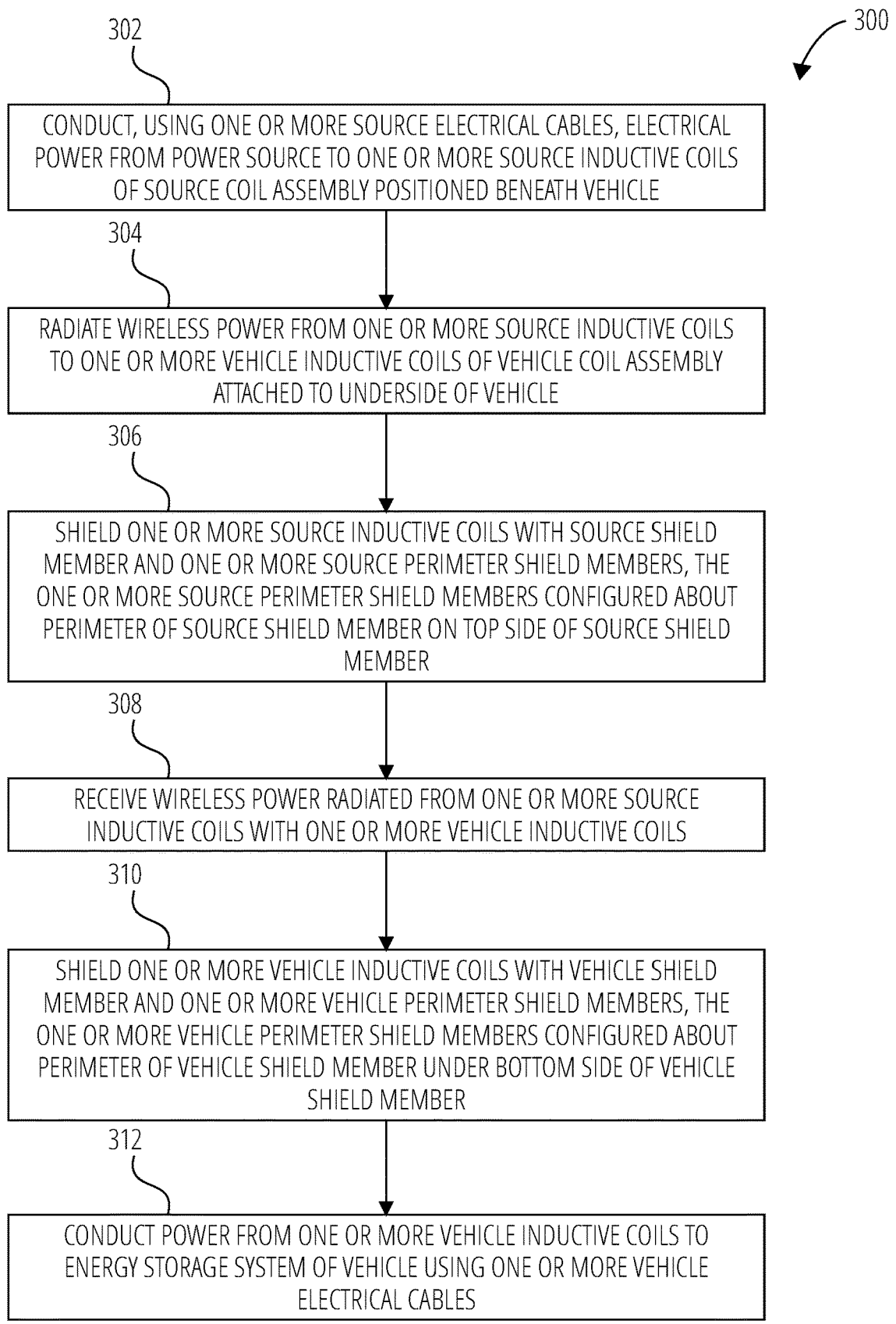
FIG. 3 is a flowchart illustrating a method of wirelessly charging a vehicle, according to some embodiments.

FIG. 3 is a flowchart illustrating a method 300 of wirelessly charging a vehicle, according to some embodiments. In operation 302, the method 300 includes conducting, using one or more source electrical cables, electrical power from a power source to one or more source inductive coils of a source coil assembly positioned beneath a vehicle. In operation 304, the method 300 includes radiating wireless power from the one or more source inductive coils to one or more vehicle inductive coils of a vehicle coil assembly attached to an underside of the vehicle. In operation 306, the method 300 includes shielding the one or more source inductive coils with a source shield member and one or more source perimeter shield members. The one or more source perimeter shield members are configured about a perimeter of the source shield member on a top side of the source shield member. By way of non-limiting example, the one or more source perimeter shield members may be arranged intermittently about the perimeter of the source shield member (e.g., FIG. 2, FIG. 6, and FIG. 8). Also by way of non-limiting example, the one or more source perimeter shield members may be arranged continuously about the perimeter of the source shield member (e.g., FIG. 7 and FIG. 12). As a further non-limiting example, the one or more source perimeter shield members may be arranged continuously about only some of the sides of the perimeter of the source shield member, but not others of the sides (e.g., lateral sides such as those shown in FIG. 11). As yet a further non-limiting example, the source shield member may extend horizontally beyond the source perimeter shield members on at least one lateral side (e.g., all lateral sides as shown in FIG. 8, only some of the lateral sides and not others of the lateral sides as shown in FIG. 12).

In operation 308, the method 300 includes receiving the wireless power radiated from the one or more source inductive coils with one or more vehicle inductive coils. In operation 310, the method 300 includes shielding the one or more vehicle inductive coils with a vehicle shield member and one or more vehicle perimeter shield members. The one or more vehicle perimeter shield members are configured about a perimeter of the vehicle shield member under a bottom side of the vehicle shield member. By way of non-limiting example, the one or more vehicle perimeter shield members may be arranged intermittently about the perimeter of the vehicle shield member (e.g., FIG. 2, FIG. 6, and FIG. 8). Also by way of non-limiting example, the one or more vehicle perimeter shield members may be arranged continuously about the perimeter of the vehicle shield member (e.g., FIG. 7 and FIG. 12). As a further non-limiting example, the one or more vehicle perimeter shield members may be arranged continuously about only some of the sides of the perimeter of the vehicle shield member, but not others of the sides (e.g., lateral sides such as those shown in FIG. 11). As yet a further non-limiting example, the vehicle shield member may extend horizontally beyond the vehicle perimeter shield members on at least one lateral side (e.g., all lateral sides as shown in FIG. 8, only some of the lateral sides and not others of the lateral sides as shown in FIG. 12). In operation 312, the method 300 includes conducting power from the one or more vehicle inductive coils to an energy storage system of the vehicle using one or more vehicle electrical cables.

Figure 4:
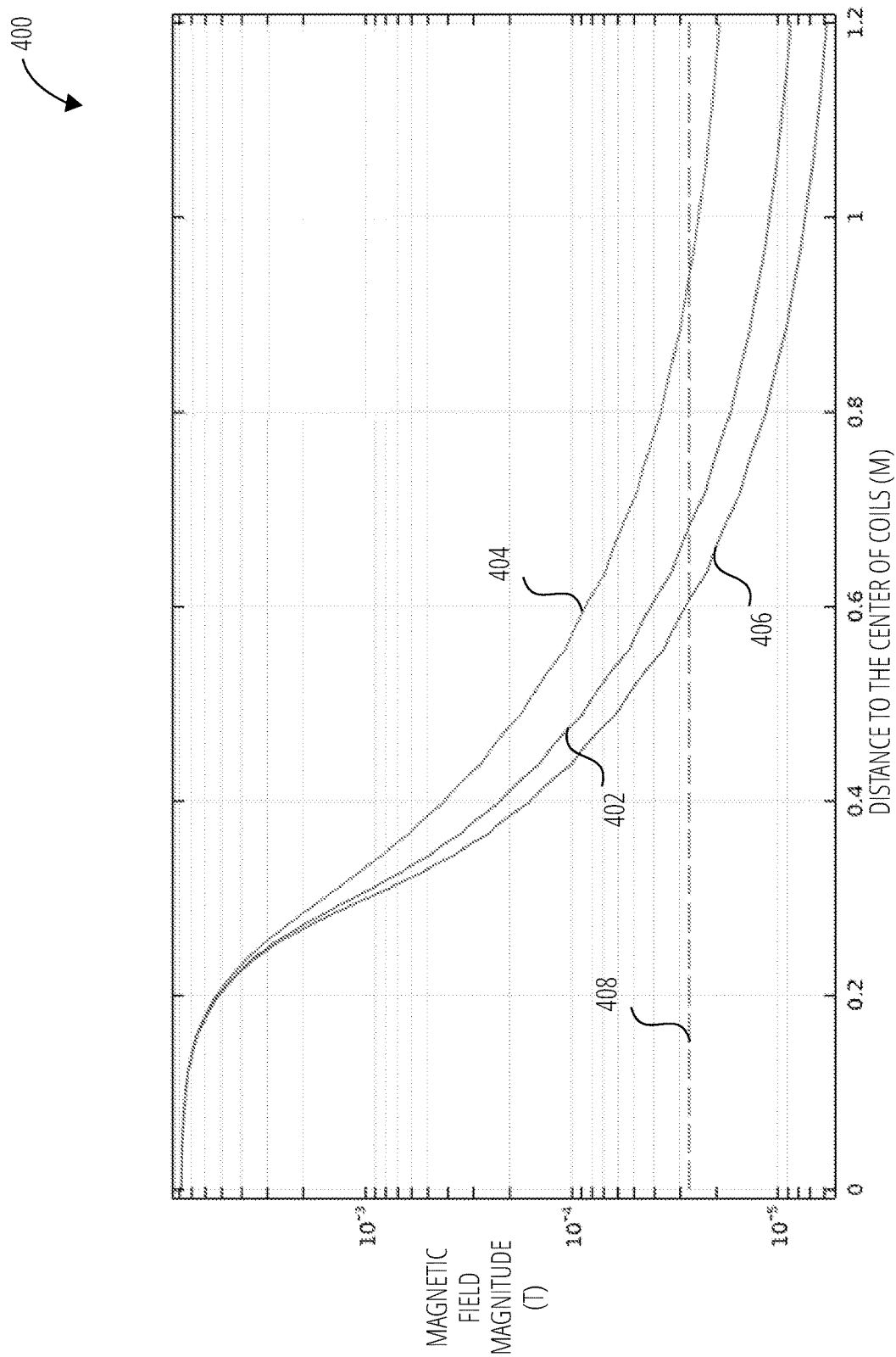
FIG. 4 is a plot illustrating an effectiveness of shielding of the electromagnetic shield of FIG. 2 for a 100 kW WPT.

FIG. 4 is a plot 400 illustrating an effectiveness of shielding of the electromagnetic shield 200 of FIG. 2 for a 100 kW WPT. The plot 400 includes an intermittent lateral shielding plot 402 (e.g., corresponding to FIG. 2 or FIG. 6), a no lateral shielding plot 404, and a continuous lateral shielding plot 406 (e.g., corresponding to FIG. 7). The intermittent lateral shielding plot 402 corresponds to embodiments disclosed herein (e.g., including the vehicle perimeter shield members 210 and the source perimeter shield members 206 of FIG. 2). The no lateral shielding plot 404 corresponds to a shield that does not include the vehicle perimeter shield members 210 and the source perimeter shield members 206 of FIG. 2. The continuous lateral shielding plot 406 corresponds to a shield that includes continuous lateral shielding around the perimeters of a vehicle shield member 702 and a source shield member 704 of FIG. 7. The plot 400 further includes a regulation threshold 408, which the SAE J2954 specification has set at 27 µT at 0.8 meters from the center of the coils (e.g., the vehicle inductive coils 218 and source inductive coils 212 of FIG. 2). The intermittent lateral shielding plot 402, the no lateral shielding plot 404, and the continuous lateral shielding plot 406 are plots of magnetic field magnitudes, in Tesla (T), plotted against distance to a center of the coils.

As illustrated by the no lateral shielding plot 404, without lateral shielding such as the vehicle perimeter shield members 210 and the source perimeter shield members 206, the magnetic field magnitude is higher (about 37.18 µT) than the regulation threshold 408 (27 µT) at 0.8 meters from the center of the coils. In contrast, as illustrated by the intermittent lateral shielding plot 402, the use of intermittent lateral shielding (e.g., the vehicle perimeter shield members 210 and the source perimeter shield members 206) reduces the EM fields to within the requirements of SAE J2954. Specifically, the intermittent lateral shielding plot 402 takes the value of about 17.14 µT at 0.8 meters from the center of the coils, which amounts to about a 50% reduction of EM fields as compared to the no lateral shielding case. Finally, although the continuous lateral shielding plot 406 illustrates even greater shielding than the intermittent lateral shielding plot 402 (about 11.51 µT at 0.8 meters from the center of the coils), the resulting weight is about twice that of the discontinuous loop design and a resulting coupling efficiency may be reduced to undesirable levels due, at least in part, to eddy currents (e.g., if a utilized ferrite's electrical resistivity is not high or other alternative magnetic materials with lower electrical resistivity than ferrite are used due to the limited supply or high cost of high-performance ferrites). As a result, the use of intermittent shielding is an acceptable balance between coupling efficiency and effectiveness of shielding.

Figure 5:
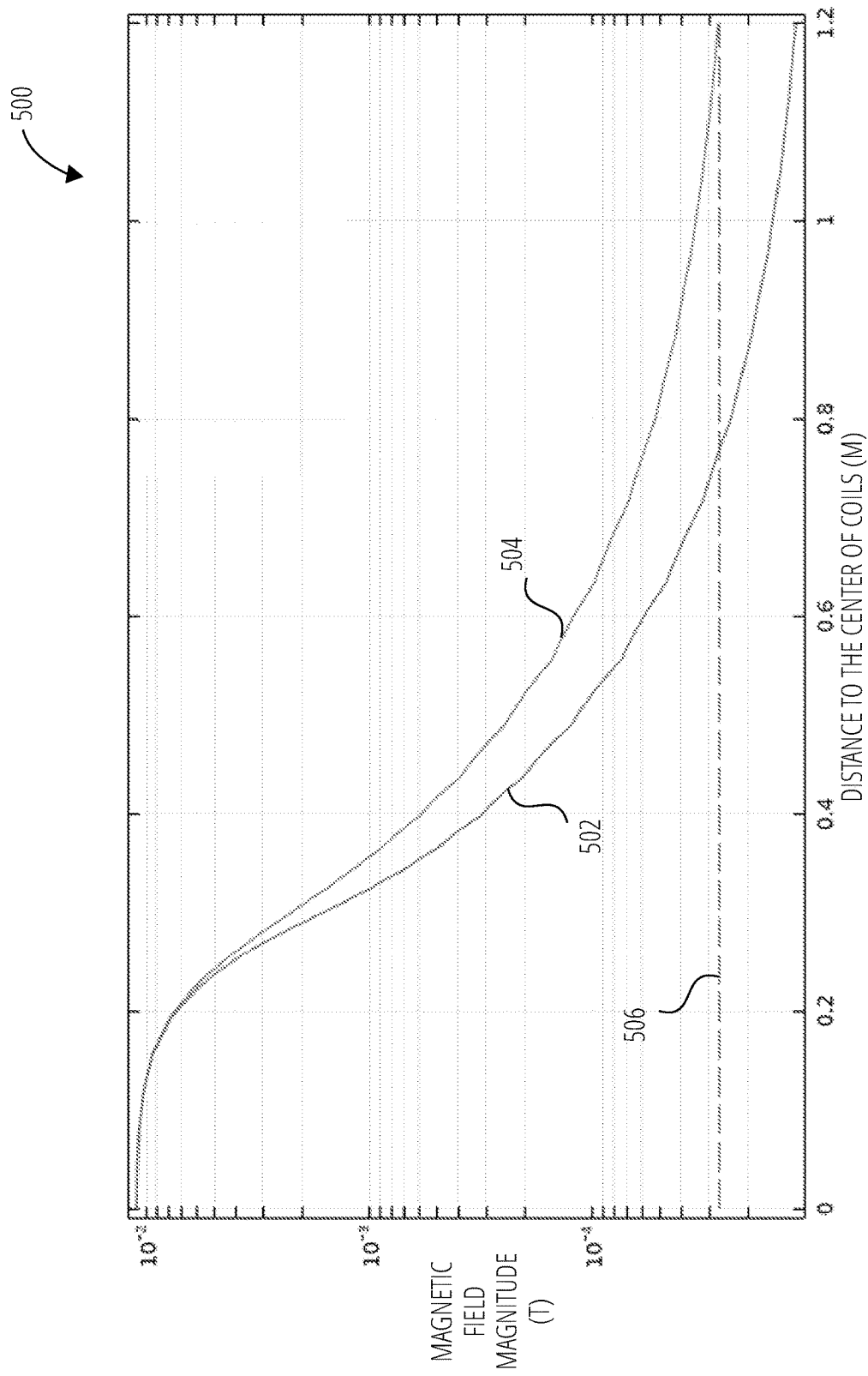
FIG. 5 is a plot illustrating an effectiveness of shielding of the electromagnetic shield of FIG. 2 for a 200 kW WPT.

FIG. 5 is a plot 500 illustrating an effectiveness of shielding of the electromagnetic shield 200 of FIG. 2 for a 200 kW WPT. The plot 500 includes an intermittent lateral shielding plot 502 and a no lateral shielding plot 504. The intermittent lateral shielding plot 502 corresponds to embodiments disclosed herein (e.g., including the vehicle perimeter shield members 210 and the source perimeter shield members 206 of FIG. 2). The no lateral shielding plot 504 corresponds to a shield that does not include the vehicle perimeter shield members 210 and the source perimeter shield members 206 of FIG. 2. The plot 500 further includes a regulation threshold 506, which the SAE J2954 specification has set at 27 µT at 0.8 meters from the center of the coils (e.g., the vehicle inductive coils 218 and source inductive coils 212 of FIG. 2). The intermittent lateral shielding plot 502 and the no lateral shielding plot 504 are plots of magnetic field magnitudes, in Tesla (T), plotted against distance to a center of the coils.

As illustrated by the no lateral shielding plot 504, without lateral shielding such as the vehicle perimeter shield members 210 and the source perimeter shield members 206, the magnetic field magnitude is higher (about 52.62 µT) than the regulation threshold 506 (27 µT) at 0.8 meters from the center of the coils. In contrast, as illustrated by the intermittent lateral shielding plot 502, the use of intermittent lateral shielding (e.g., the vehicle perimeter shield members 210 and the source perimeter shield members 206) reduces the EM fields to within the requirements of SAE J2954. Specifically, the intermittent lateral shielding plot 502 takes the value of about 24.15 µT at 0.8 meters from the center of the coils, which amounts to about a 50% reduction of EM fields as compared to the no lateral shielding case.

Figure 6:
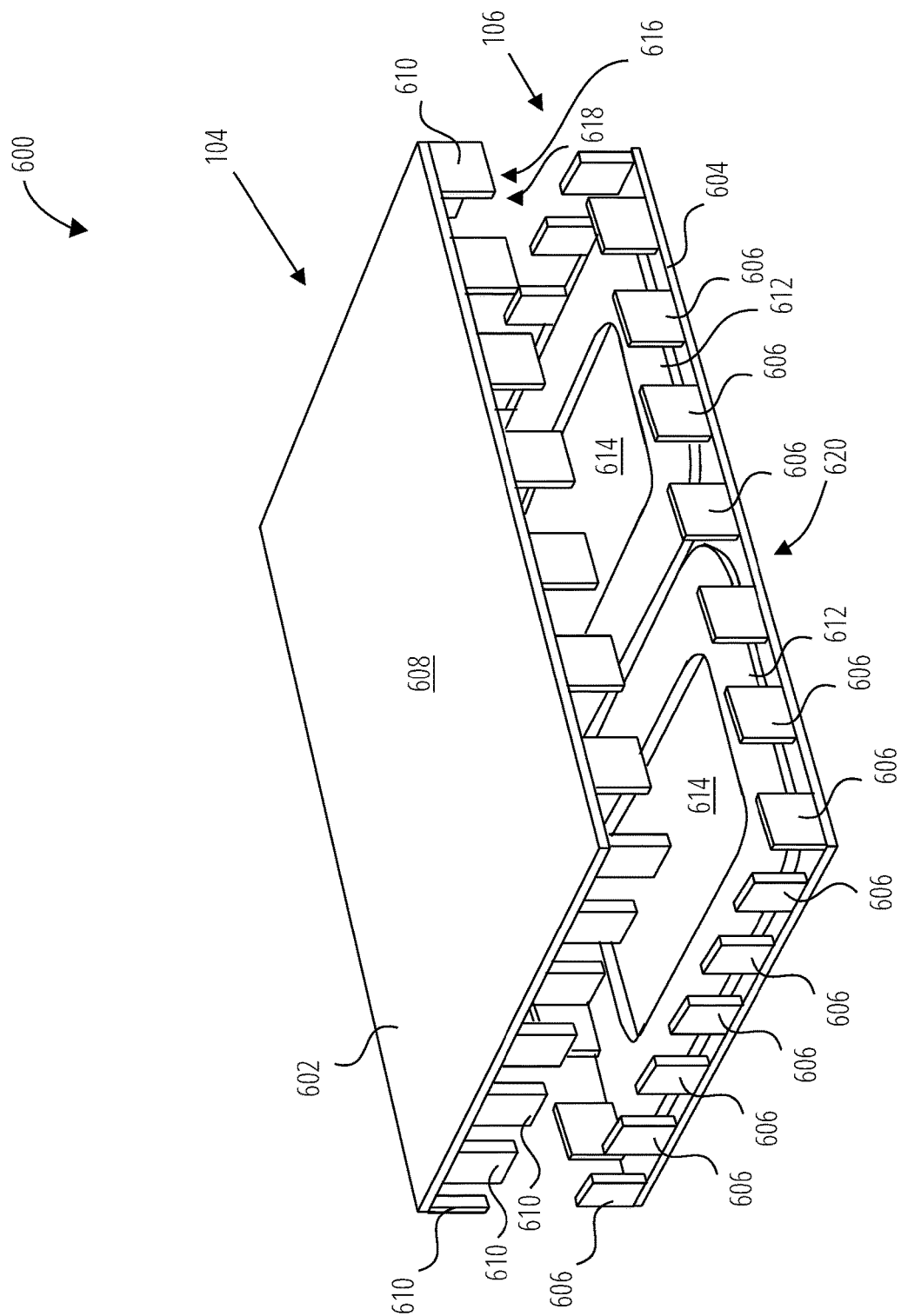
FIG. 6 is a perspective view of another example of an electromagnetic shield of the wireless charging system of FIG. 1.

FIG. 6 is a perspective view of another example of an electromagnetic shield 600 of the wireless charging system 100 of FIG. 1. The electromagnetic shield 600 includes examples of the vehicle coil assembly 104 and the source coil assembly 106 of FIG. 1. The vehicle coil assembly 104 includes a vehicle shield member 602 and vehicle perimeter shield members 610 similar to the vehicle shield member 202 and the vehicle perimeter shield members 210 of FIG. 2. The vehicle shield member 602 includes a vehicle side 608 (e.g., facing the underside of the vehicle 102 of FIG. 1) and a vehicle coil side 616 (e.g., facing one or more vehicle inductive coils 618) opposite the vehicle side 608, similar to the vehicle side 208 and the vehicle coil side 216 of FIG. 2. The vehicle perimeter shield members 610 are distributed discontinuously around an outer perimeter of the vehicle coil side 616 of the vehicle shield member 602, similarly to the vehicle perimeter shield members 210. The vehicle perimeter shield members 610, however, are narrower in a horizontal direction and more numerous than the vehicle perimeter shield members 210 of the electromagnetic shield 200 of FIG. 2.

The source coil assembly 106 includes a source shield member 604 and source perimeter shield members 606 similar to the source shield member 204 and the source perimeter shield members 206 of FIG. 2. The source shield member 604 includes a ground side 620 (e.g., facing the ground if the source coil assembly 106 is placed on the ground or facing further underground if the source coil assembly 106 is placed within the ground) and a source coil side 614 (e.g., facing one or more source inductive coils 612) opposite the ground side 620. The ground side 620 and the source coil side 614 are similar to the ground side 220 and the source coil side 214 of FIG. 2. With the vehicle coil assembly 104 aligned with the source coil assembly 106, the vehicle coil side 616 of the vehicle shield member 602 faces the source coil side 614 of the source shield member 604. The source perimeter shield members 606 are distributed discontinuously around an outer perimeter of the source coil side 614 of the source shield member 604 similar to the source perimeter shield members 206 of FIG. 2. The source perimeter shield members 606, however, are narrower in the horizontal direction and more numerous than the source perimeter shield members 206 of the electromagnetic shield 200 of FIG. 2.

Figure 7:
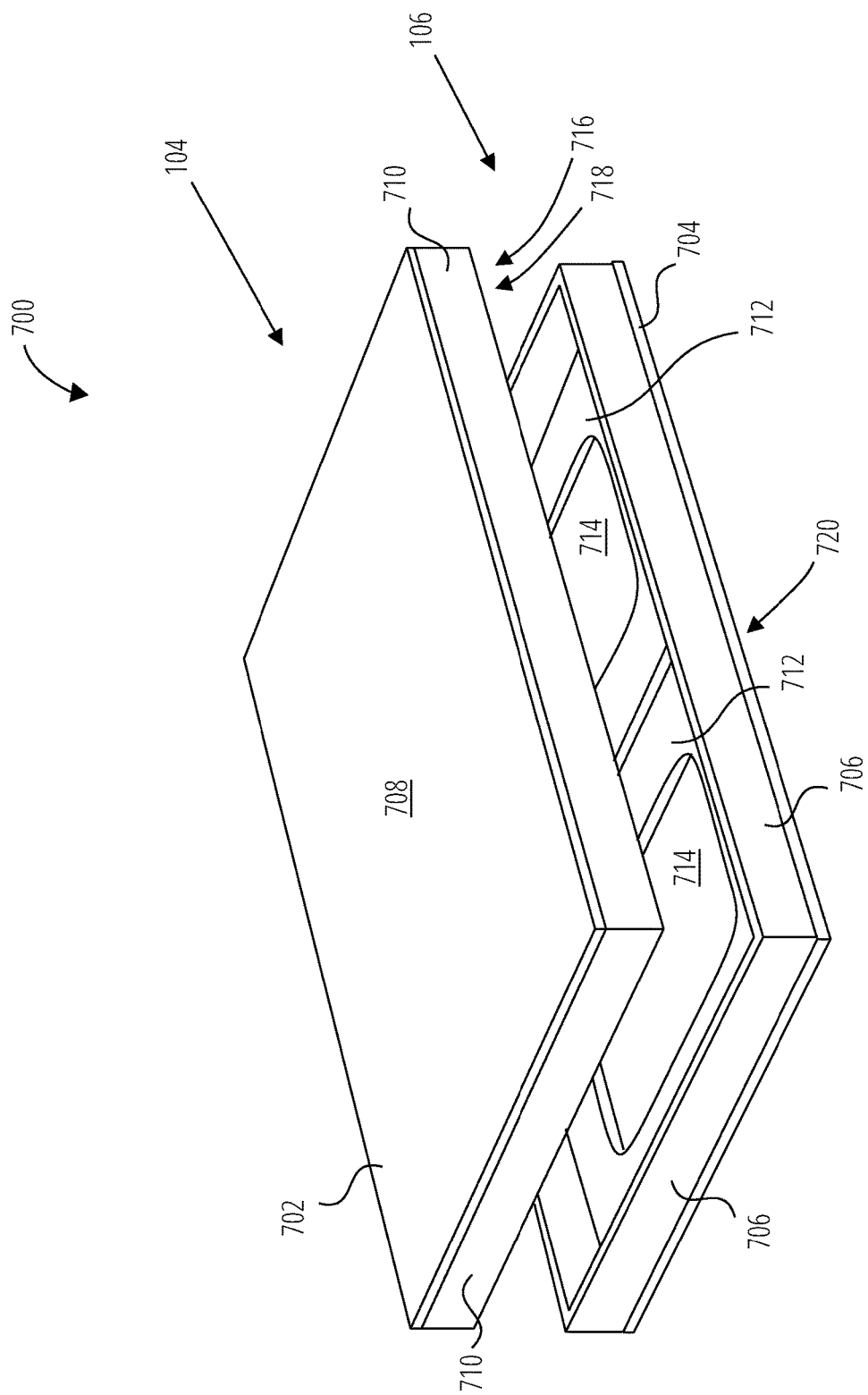
FIG. 7 is a perspective view of another example of an electromagnetic shield of the wireless charging system of FIG. 1.
Figure 8:
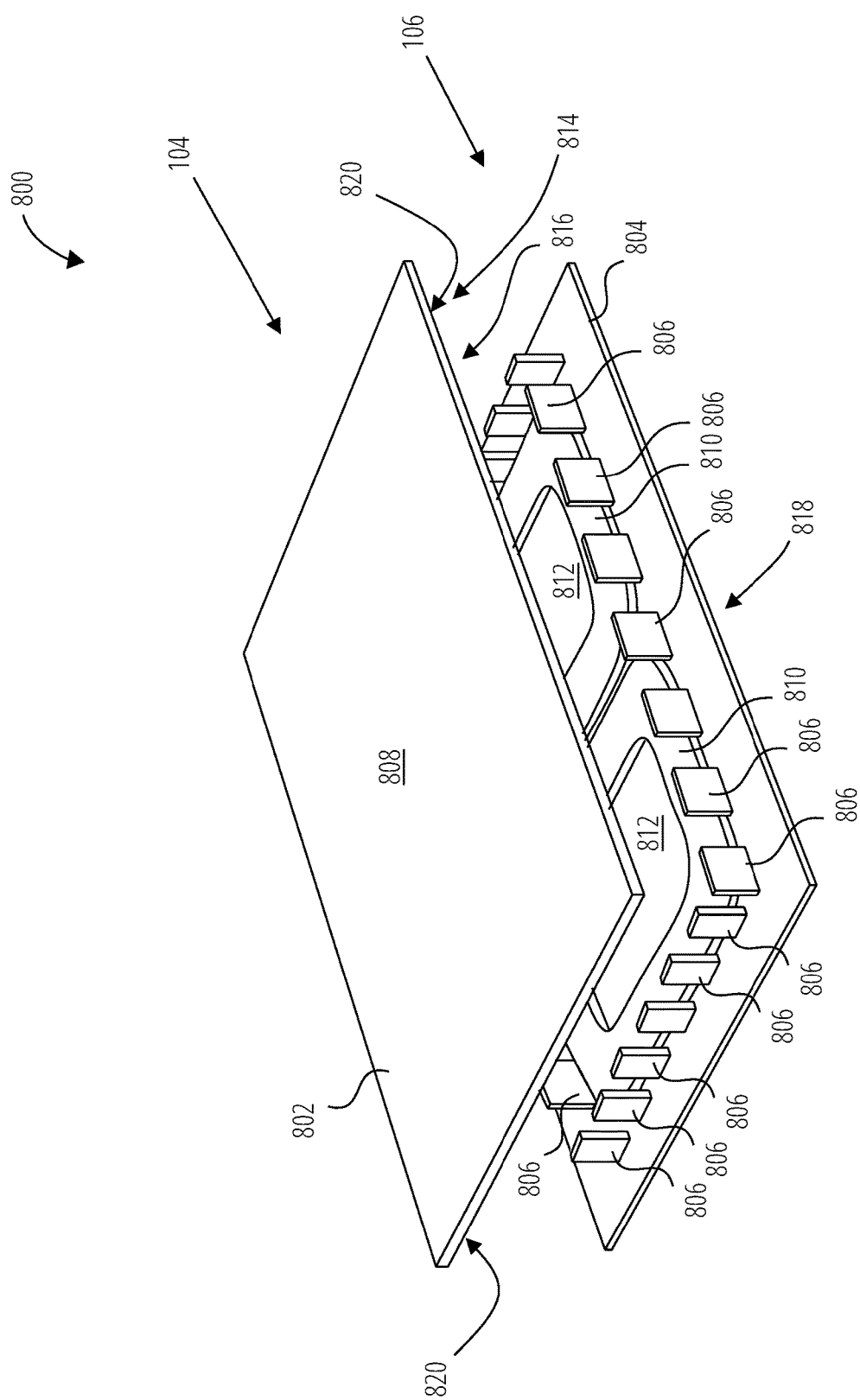
FIG. 8 is a perspective view of another example of an electromagnetic shield of the wireless charging system of FIG. 1.

FIG. 7 is a perspective view of another example of an electromagnetic shield 700 of the wireless charging system 100 of FIG. 1. The electromagnetic shield 700 includes examples of the vehicle coil assembly 104 and the source coil assembly 106 of FIG. 1. The vehicle coil assembly 104 includes a vehicle shield member 702 and vehicle perimeter shield members 710 similar to the vehicle shield member 202 and the vehicle perimeter shield members 210 of FIG. 2. The vehicle shield member 702 includes a vehicle side 708 (e.g., facing the underside of the vehicle 102 of FIG. 1) and a vehicle coil side 716 (e.g., facing one or more vehicle inductive coils 718) opposite the vehicle side 708, similar to the vehicle side 208 and the vehicle coil side 216 of FIG. 2. The vehicle perimeter shield members 710 are distributed continuously around an outer perimeter of the vehicle coil side 716 of the vehicle shield member 702 in contrast to the vehicle perimeter shield members 210 of FIG. 2 and the vehicle perimeter shield members 610 of FIG. 6, which are discontinuously distributed.

The source coil assembly 106 includes a source shield member 704 and source perimeter shield members 706 similar to the source shield member 204 and the source perimeter shield members 206 of FIG. 2. The source shield member 704 includes a ground side 720 (e.g., facing the ground if the source coil assembly 106 is placed on the ground or facing further underground if the source coil assembly 106 is placed within the ground) and a source coil side 714 (e.g., facing one or more source inductive coils 712) opposite the ground side 720. The ground side 720 and the source coil side 714 are similar to the ground side 220 and the source coil side 214 of FIG. 2. With the vehicle coil assembly 104 aligned with the source coil assembly 106, the vehicle coil side 716 of the vehicle shield member 702 faces the source coil side 714 of the source shield member 704. The source perimeter shield members 706 are distributed continuously around an outer perimeter of the source coil side 714 of the source shield member 704 in contrast to the source perimeter shield members 206 of FIG. 2 and the source perimeter shield members 606 of FIG. 6, which are discontinuously distributed.

With the vehicle perimeter shield members 710 and the source perimeter shield members 706 continuously distributed, the vehicle perimeter shield members 710 and the source perimeter shield members 706 form continuous loops. It will be understood that a similar result may be achieved using single continuous loops for each of the vehicle coil assembly 104 and the source coil assembly 106. Because of the continuous perimeter loops, the electromagnetic shield 700 may result in increased eddy currents and lower coupling efficiency as compared to the electromagnetic shield 200 of FIG. 2 and the electromagnetic shield 600 of FIG. 6. In instances, however, where increased shielding, as compared to that of the electromagnetic shield 200 and the electromagnetic shield 600, would be needed or helpful (e.g., very high-power wireless charging, sensitive electronics in the immediate vicinity, etc.), the electromagnetic shield 700 may strike an acceptable balance between shielding effectiveness and coupling efficiency.

In some embodiments the source perimeter shield members 806 and/or the vehicle perimeter shield members 810 include materials having a relatively high electrical resistivity (e.g., ferrite with relatively high electrical resistivity). The use of materials with relatively high electrical resistivity may limit eddy current loss to a relatively low level.

FIG. 8 is a perspective view of another example of an electromagnetic shield 800 of the wireless charging system 100 of FIG. 1. The electromagnetic shield 600 includes examples of the vehicle coil assembly 104 and the source coil assembly 106 of FIG. 1. The vehicle coil assembly 104 includes a vehicle shield member 802 and vehicle perimeter shield members 810 similar to the vehicle shield member 202 and the vehicle perimeter shield members 210 of FIG. 2 except that the vehicle shield member 802 extends beyond the vehicle perimeter shield members 810. In other words, the vehicle perimeter shield members 810 are arranged in a loop spaced away from a perimeter edge of the vehicle shield member 802. In some embodiments a portion of the vehicle shield member 802 that extends beyond the vehicle perimeter shield members 810 in a direction of travel of the vehicle 102 (FIG. 1) is less than or equal to 75 mm. In some embodiments a portion of the vehicle shield member 802 that extends beyond the vehicle perimeter shield members 810 in a transverse direction of the vehicle 102 is less than or equal to 100 mm. The vehicle shield member 802 includes a vehicle side 808 (e.g., facing the underside of the vehicle 102 of FIG. 1) and a vehicle coil side 816 (e.g., facing one or more vehicle inductive coils 818) opposite the vehicle side 808, similar to the vehicle side 208 and the vehicle coil side 216 of FIG. 2. The vehicle perimeter shield members 810 are distributed discontinuously proximate to an outer perimeter of the vehicle coil side 816 of the vehicle shield member 802, similarly to the vehicle perimeter shield members 210 except that the vehicle perimeter shield members 810 are not at the perimeter edge of the vehicle shield member 802.

The source coil assembly 106 includes a source shield member 804 and source perimeter shield members 806 similar to the source shield member 204 and the source perimeter shield members 206 of FIG. 2 except that the source shield member 804 extends beyond the source perimeter shield members 806. In other words, the source perimeter shield members 806 are arranged in a loop away from the perimeter edge of the source shield member 804. In some embodiments a portion of the source shield member 804 that extends beyond the source perimeter shield members 806 in a direction of travel of the vehicle 102 (FIG. 1) is less than or equal to 75 mm. In some embodiments a portion of the source shield member 804 that extends beyond the source perimeter shield members 806 in a transverse direction of the vehicle 102 is less than or equal to 100 mm. The source shield member 804 includes a ground side 820 (e.g., facing the ground if the source coil assembly 106 is placed on the ground or facing further underground if the source coil assembly 106 is placed within the ground) and a source coil side 814 (e.g., facing one or more source inductive coils 812) opposite the ground side 820. The ground side 820 and the source coil side 814 are similar to the ground side 220 and the source coil side 214 of FIG. 2. With the vehicle coil assembly 104 aligned with the source coil assembly 106, the vehicle coil side 816 of the vehicle shield member 802 faces the source coil side 814 of the source shield member 804. The source perimeter shield members 806 are distributed discontinuously proximate to an outer perimeter of the source coil side 814 of the source shield member 804 similar to the source perimeter shield members 206 of FIG. 2, similarly to the source perimeter shield members 206 except that the source perimeter shield members 806 are not at the perimeter edge of the source shield member 804.

Although not shown, in some embodiments one or more perimeter shield members may form a continuous loop proximate to the perimeter of the vehicle shield member 802 and/or the source shield member 804, but be positioned away from the perimeter edge thereof, similarly to the vehicle perimeter shield members 810 and source perimeter shield members 806 of FIG. 8.

Figure 9:
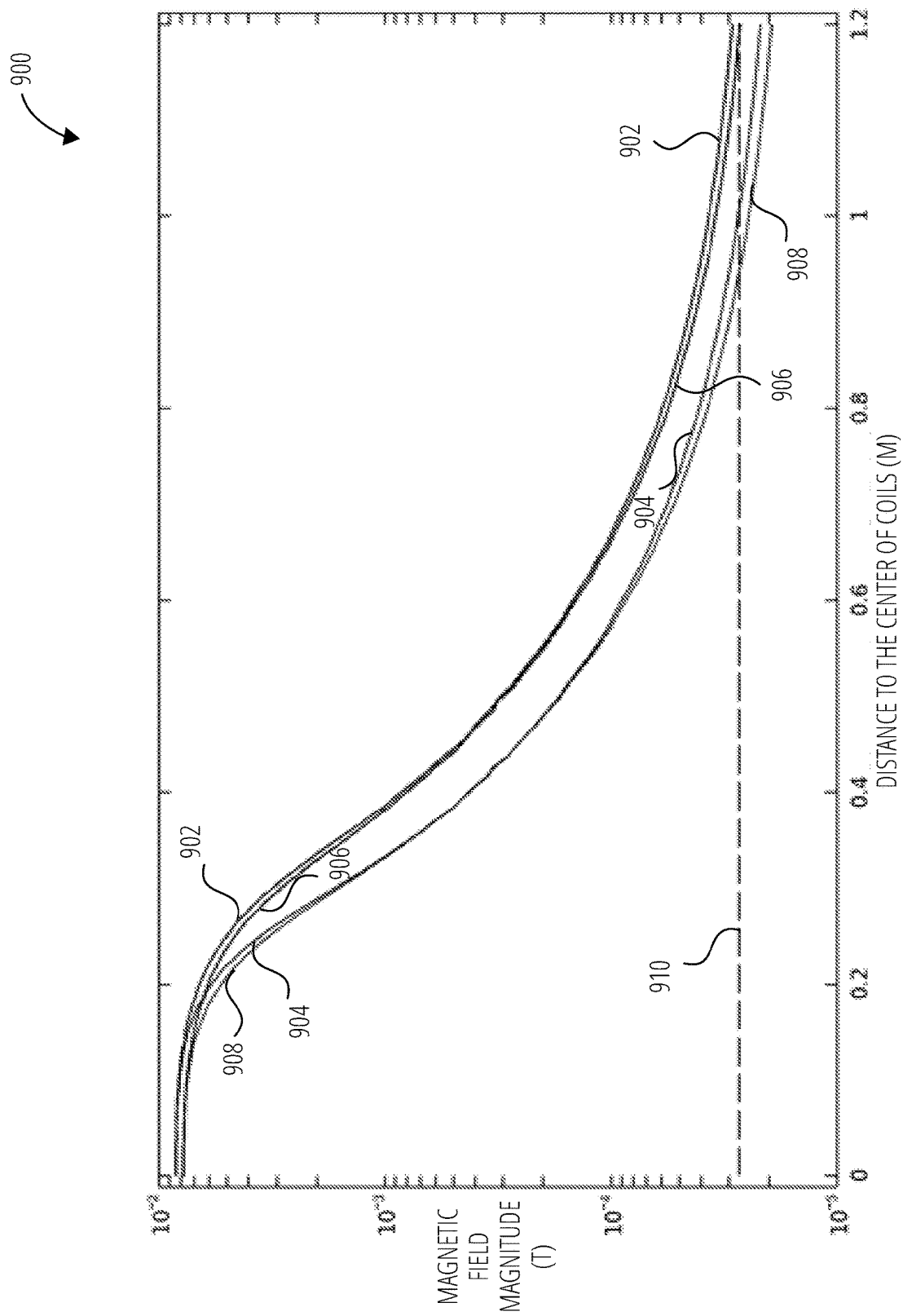
FIG. 9 is a plot illustrating effectiveness of shielding without perimeter shielding members at various misalignments between a vehicle coil assembly and a source coil assembly of FIG. 1.

FIG. 9 is a plot 900 illustrating effectiveness of shielding without perimeter shielding members at various misalignments between a vehicle coil assembly 104 and a source coil assembly 106 of FIG. 1. The plot 900 includes an x and y misalignment plot 902, an x misalignment plot 904, a y misalignment plot 906, a no misalignment plot 908, and a regulation threshold 910 (27 µT). The regulation threshold 910 is the same as the regulation threshold 408 and the regulation threshold 506 of FIG. 4 and FIG. 5, respectively. The x and y misalignment plot 902 corresponds to magnetic field magnitude, in Tesla (T) plotted against distance to the center of coils in the presence of a 75 mm x-directional misalignment and a 100 mm y-directional misalignment. The x-direction is taken to be a direction extending between a front and a back of a vehicle, or in other words, a direction of travel that the vehicle would move in. The y-direction is taken to be a direction extending perpendicularly to the x-direction. In other words, the y-direction extends side to side relative to the vehicle. The x misalignment plot 904 corresponds to a magnetic field magnitude plotted against distance to the center of coils in the presence of a 75 mm x-directional misalignment and no y-directional misalignment. The y misalignment plot 906 corresponds to a magnetic field magnitude plotted against distance to the center of the coils in the presence of a 100 mm y-directional misalignment and no x-directional misalignment. The no misalignment plot 908 corresponds to a magnetic field magnitude plotted against distance to the center of coils in the presence of not x-directional and no y-directional misalignments. As can be seen by inspecting FIG. 4 and FIG. 9 together, the no misalignment plot 908 is similar to the no lateral shielding plot 404.

At just over 0.8 meters from the center of the coils, the x and y misalignment plot 902 is about 59.4 µT and the no misalignment plot 908 is about 37.4 µT, amounting to about a 22 µT difference in magnetic field amplitude between the x and y misalignment plot 902 and the no misalignment plot 908 at this point. As a result, the plot 900 illustrates that misalignments have a relatively large impact on the shielding effectiveness in the absence of perimeter shield members.

Figure 10:
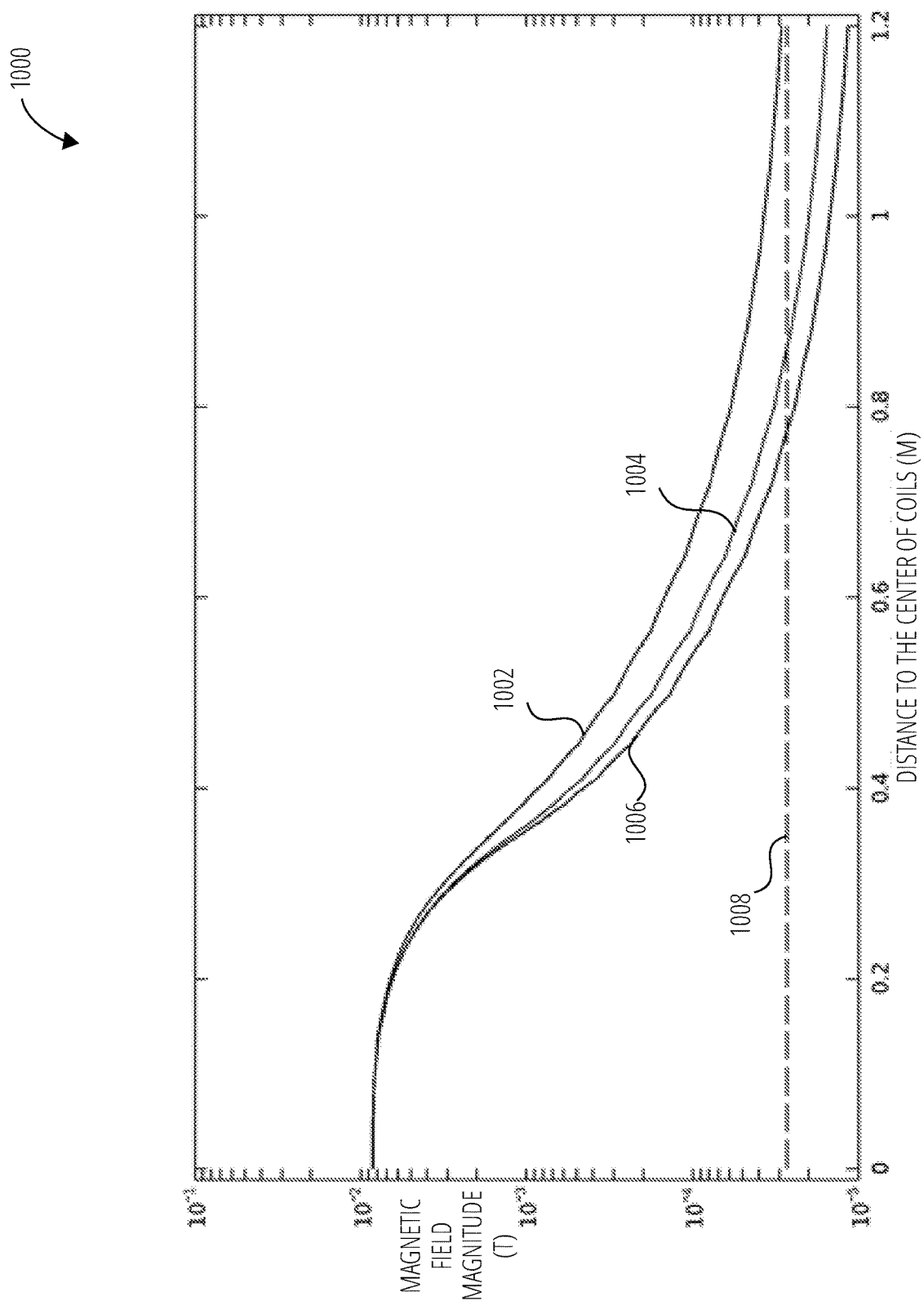
FIG. 10 is a plot illustrating effectiveness of shielding with and without perimeter shielding members and with misalignment between the vehicle coil assembly and the source coil assembly of FIG. 1.

FIG. 10 is a plot 1000 illustrating effectiveness of shielding with and without perimeter shielding members and with misalignment between the vehicle coil assembly 104 and the source coil assembly 106 of FIG. 1. The plot 1000 includes a back shielding plot 1002, a discontinuous perimeter shielding plot 1004, and a continuous perimeter shielding plot 1006, each taken with an x-direction misalignment of 75 mm and a y-direction misalignment of 100 mm. The back shielding plot 1002 corresponds to the use of shielding members without the use of perimeter shielding members. The back shielding plot 1002 is the same as the x and y misalignment plot 902 of FIG. 9. The discontinuous perimeter shielding plot 1004 corresponds to the use of discontinuous shielding members (e.g., the electromagnetic shield 200 of FIG. 2 and the electromagnetic shield 600 of FIG. 6). The continuous perimeter shielding plot 1006 corresponds to the use of continuous perimeter shielding (e.g., the electromagnetic shield 700 of FIG. 7). The plot 1000 also includes a regulation threshold 1008 (27 µT), which is the same as the regulation threshold 408, the regulation threshold 506, and the regulation threshold 910 of FIG. 4, FIG. 5, and FIG. 9, respectively.

As is apparent from observing the plot 1000, the magnetic field magnitude at just over 0.8 meters from the center of the coils is about 59.4 µT for the back shielding plot 1002, about 32.6 µT for the discontinuous perimeter shielding plot 1004, and about 24.6 µT for the discontinuous perimeter shielding plot 1004. Accordingly, the use of continuous perimeter shielding is less vulnerable to loss of effectiveness than the use of discontinuous perimeter shielding (about 8 µT at just over 0.8 meter from the center of the coils) and no perimeter shielding (about 34.8 µT at over 0.8 meter from the center of the coils).

Figure 11:
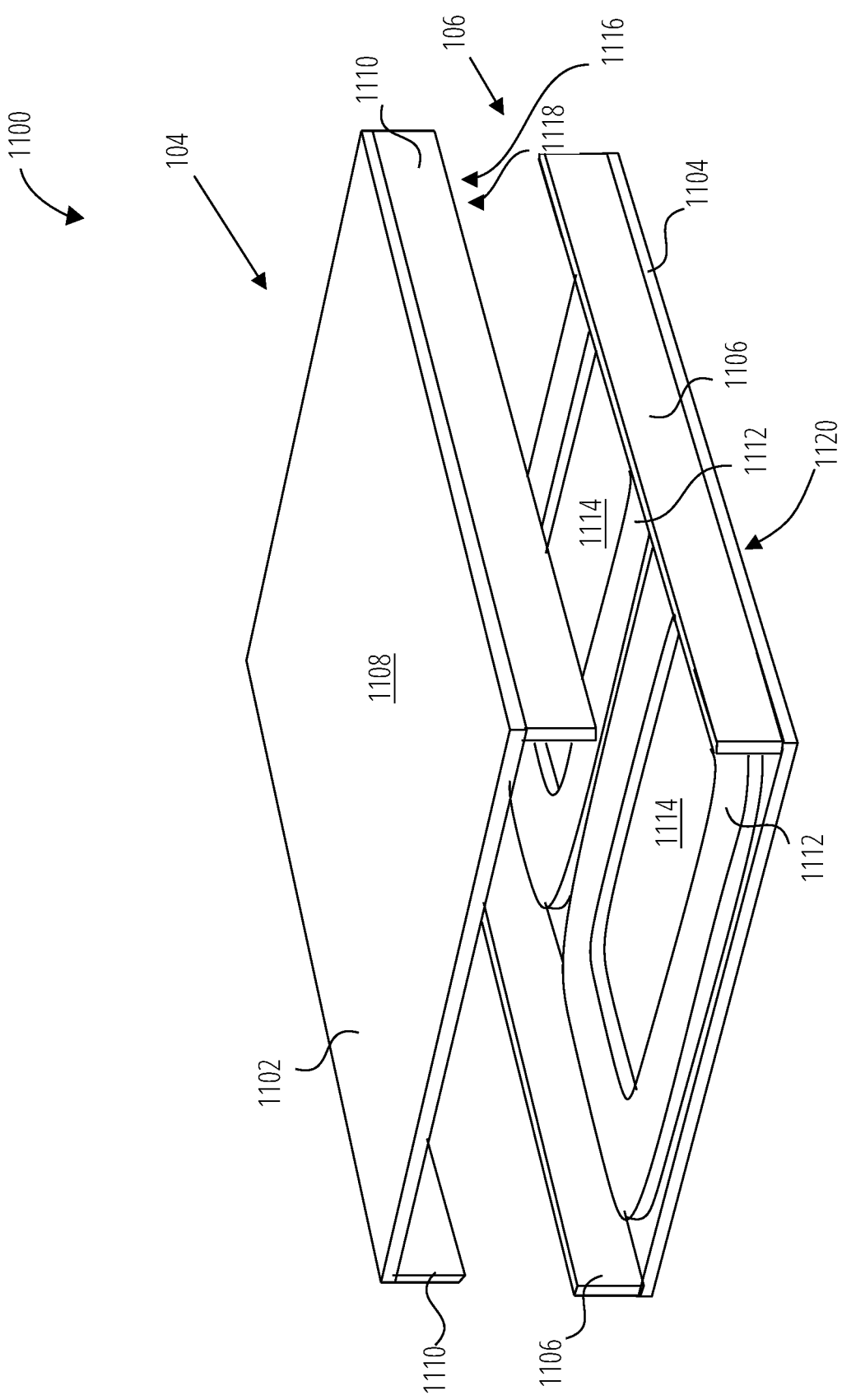
FIG. 11 is a perspective view of another example of an electromagnetic shield of the wireless charging system of FIG. 1.
Figure 12:
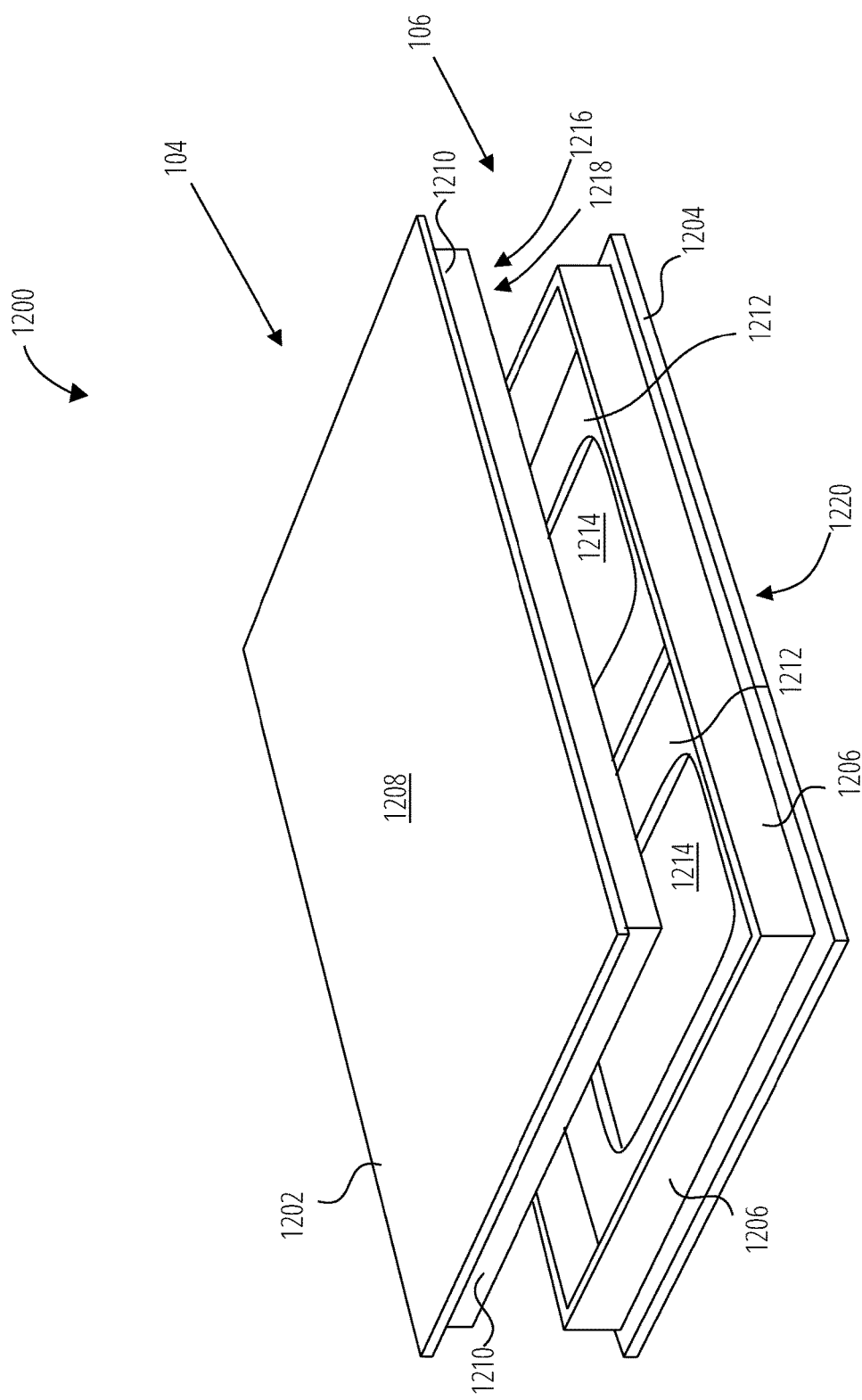
FIG. 12 is a perspective view of another example of an electromagnetic shield of the wireless charging system of FIG. 1.

FIG. 11 is a perspective view of another example of an electromagnetic shield 1100 of the wireless charging system 100 of FIG. 1. The electromagnetic shield 1100 includes examples of the vehicle coil assembly 104 and the source coil assembly 106 of FIG. 1. The vehicle coil assembly 104 includes a vehicle shield member 1102 and vehicle perimeter shield members 1110 similar to the vehicle shield member 702 and the vehicle perimeter shield members 710 of FIG. 7 except the vehicle perimeter shield members 1110 of FIG. 11 only extend along two of the four sides of the vehicle shield member 1102. The vehicle shield member 1102 includes a vehicle side 1108 (e.g., facing the underside of the vehicle 102 of FIG. 1) and a vehicle coil side 1116 (e.g., facing one or more vehicle inductive coils 1118) opposite the vehicle side 1108, similar to the vehicle side 208 and the vehicle coil side 216 of FIG. 2. The vehicle perimeter shield members 1110 are distributed continuously along only two out of four sides of an outer perimeter of the vehicle coil side 1116 of the vehicle shield member 1102, leaving lateral sides corresponding to lateral sides of the vehicle shielded and the front and back sides (corresponding to a front and back of the vehicle) unshielded.

The source coil assembly 106 includes a source shield member 1104 and source perimeter shield members 1106 similar to the source shield member 704 and the source perimeter shield members 706 of FIG. 7 except the source perimeter shield members 1106 of FIG. 11 only extend along two of the four sides of the source shield member 1104. The source shield member 1104 includes a ground side 1120 (e.g., facing the ground if the source coil assembly 106 is placed on the ground or facing further underground if the source coil assembly 106 is placed within the ground) and a source coil side 1114 (e.g., facing one or more source inductive coils 1112) opposite the ground side 1120. The ground side 1120 and the source coil side 1114 are similar to the ground side 220 and the source coil side 214 of FIG. 2. With the vehicle coil assembly 104 aligned with the source coil assembly 106, the vehicle coil side 1116 of the vehicle shield member 1102 faces the source coil side 1114 of the source shield member 1104. The source perimeter shield members 1106 are distributed continuously along only two out of four sides of an outer perimeter of the source coil side 1114 of the source shield member 1104, leaving lateral sides corresponding to lateral sides of the vehicle shielded and the front and back sides (corresponding to a front and back of the vehicle) unshielded.

FIG. 12 is a perspective view of another example of an electromagnetic shield 1200 of the wireless charging system 100 of FIG. 1. The electromagnetic shield 1200 includes examples of the vehicle coil assembly 104 and the source coil assembly 106 of FIG. 1. The electromagnetic shield 1200 is similar to the electromagnetic shield 700 of FIG. 7. For example, the electromagnetic shield 1200 includes a vehicle shield member 1202, vehicle perimeter shield members 1210, vehicle inductive coils 1218, a source shield member 1204, source perimeter shield members 1206, and source inductive coils 1212 similar to the vehicle shield member 702, vehicle perimeter shield members 710, vehicle inductive coils 718, the source shield member 704, the source perimeter shield members 706, and the source inductive coils 712 of FIG. 7. Similar to the vehicle shield member 702 of FIG. 7, the vehicle shield member 1202 includes a vehicle side 1208 and a vehicle coil side 1216 similar to the vehicle side 708 and the vehicle coil side 716 of FIG. 7. Also, similar to the source shield member 704 of FIG. 7, the source shield member 1204 includes a source coil side 1214 and a ground side 1220 similar to the source coil side 714 and the ground side 720 of FIG. 7.

In contrast to the vehicle shield member 702 of FIG. 7, the vehicle shield member 1202 extends outward beyond the vehicle perimeter shield members 1210 at all sides of the vehicle shield member 1202. Also, in contrast to the source shield member 704 of FIG. 7, the source shield member 1204 extends outwards beyond the source perimeter shield members 1206 at all sides of the source shield member 1204. The extension of the vehicle shield member 1202 and the source shield member 1204 beyond the perimeter shield members 1210, 1206 may increase electromagnetic safety in the case of misalignment of the vehicle inductive coils 1218 relative to the source inductive coils 1212.

Figure 13:
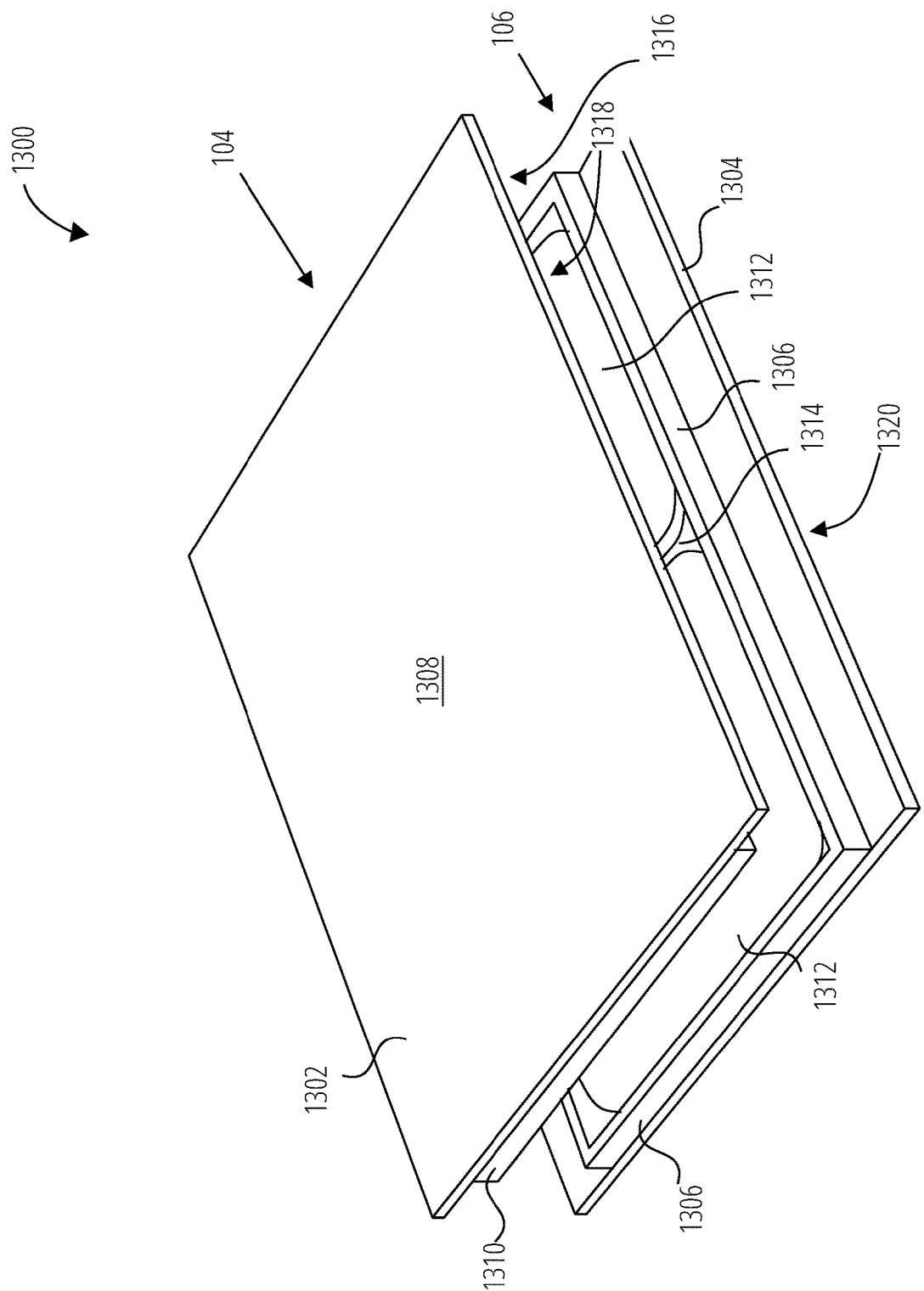
FIG. 13 is a perspective view of another example of an electromagnetic shield 1300 of the wireless charging system 100 of FIG. 1.

FIG. 13 is a perspective view of another example of an electromagnetic shield 1300 of the wireless charging system 100 of FIG. 1. The electromagnetic shield 1300 includes examples of the vehicle coil assembly 104 and the source coil assembly 106 of FIG. 1. The electromagnetic shield 1300 is similar to the electromagnetic shield 700 of FIG. 7. For example, the electromagnetic shield 1300 includes a vehicle shield member 1302, vehicle perimeter shield members 1310, vehicle inductive coils 1318, a source shield member 1304, source perimeter shield members 1306, and source inductive coils 1312 similar to the vehicle shield member 702, vehicle perimeter shield members 710, vehicle inductive coils 718, the source shield member 704, the source perimeter shield members 706, and the source inductive coils 712 of FIG. 7. Similar to the vehicle shield member 702 of FIG. 7, the vehicle shield member 1202 includes a vehicle side 1308 and a vehicle coil side 1316 similar to the vehicle side 708 and the vehicle coil side 716 of FIG. 7. Also, similar to the source shield member 704 of FIG. 7, the source shield member 1304 includes a source coil side 1314 and a ground side 1320 similar to the source coil side 714 and the ground side 720 of FIG. 7.

In contrast to the vehicle shield member 702 of FIG. 7, the vehicle shield member 1302 extends outward beyond the vehicle perimeter shield members 1310 at only two out of four sides of the vehicle shield member 1302. Specifically, the vehicle shield member 1302 extends outward beyond the lateral sides, but not the front side and the back side (corresponding to the front and back of the vehicle) of the vehicle shield member 1302. Also, in contrast to the source shield member 704 of FIG. 7, the source shield member 1304 extends outwards beyond the source perimeter shield members 1306 at only two sides, the lateral sides not the front and back sides, of the source shield member 1304.

The electromagnetic shield 1300 differs from the electromagnetic shield 700 in that the vehicle shield member 1302 and the source shield member 1304 extend beyond the perimeter shield members (i.e., the vehicle perimeter shield members 1310 and the source perimeter shield members 1306) at the lateral sides. Similarly as discussed above with reference to FIG. 12, the extension of the vehicle shield member 1302 and the source shield member 1304 beyond the perimeter shield members 1310, 1306, albeit at only the lateral sides, may increase electromagnetic safety in the case of misalignment of the vehicle inductive coils 1318 relative to the source inductive coils 1312. The electromagnetic shield 1300 also differs from the electromagnetic shield 1200 of FIG. 12 in that the vehicle shield member 1302 and the source shield member 1304 only extend outward past the vehicle perimeter shield members 1310 and the source perimeter shield members 1306 at the lateral sides, not the front and back sides. As a result, the vehicle shield member 1302 and the source shield member 1304 may weigh less than the vehicle shield member 1202 and the source shield member 1204 of FIG. 12 while still providing increased electromagnetic safety in the case of coil misalignment.

EXAMPLES

A non-exhaustive, non-limiting list of example embodiments follows. Not each of the example embodiments listed below are explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: An electromagnetic shield, comprising: a shield member including a coil side configured to face one or more inductive coils; and one or more perimeter shield members configured in a loop proximate to a perimeter of the coil side of the shield member; wherein the shield member and the one or more perimeter shield members are configured to shield electromagnetic radiation emitted by the one or more inductive coils.

Example 2: The electromagnetic shield of Example 1, wherein the one or more perimeter shield members comprise a plurality of perimeter shield members distributed in a discontinuous loop proximate to the perimeter of the coil side of the shield member.

Example 3: The electromagnetic shield of Example 1, wherein the one or more perimeter shield members comprise a single perimeter shield member proximate to the perimeter of the coil side of the shield member.

Example 4: The electromagnetic shield of Example 1, wherein the one or more perimeter shield members comprise a plurality of perimeter shield members distributed in a continuous loop proximate to the perimeter of the coil side of the shield member.

Example 5: The electromagnetic shield according to any one of Examples 1-4, wherein the one or more perimeter shield members are configured at a perimeter edge of the shield member.

Example 6: The electromagnetic shield according to any one of Examples 1-4, wherein a portion of the shield member extends between the one or more shield members and a perimeter edge of the shield member.

Example 7: The electromagnetic shield of Example 6, wherein the portion of the shield member that extends between the one or more shield members and the perimeter edge of the shield member is less than or equal to 75 millimeters (mm) between the one or more shield members and the perimeter edge in a first direction and less than or equal to 100 mm in a second direction perpendicular to the first direction.

Example 8: The electromagnetic shield according to any one of Examples 1-7, wherein the one or more perimeter shield members are configured to extend from the coil side of the shield member.

Example 9: The electromagnetic shield according to any one of Examples 1-8, wherein the shield member comprises one of aluminum, ferrite, or a mixture including aluminum and ferrite.

Example 10: The electromagnetic shield according to any one of Examples 1-8, wherein the one or more perimeter shield members comprise a ferrite material.

Example 11: The electromagnetic shield of Example 1, wherein the one or more perimeter shield members comprise are configured in a continuous loop proximate to the perimeter of the coil side of the shield member and the one or more perimeter shield members include ferrite materials having a relatively high electrical resistivity.

Example 12: The electromagnetic shield of Example 1, wherein the one or more perimeter shield members are configured in a discontinuous loop around the perimeter of the coil side of the shield member and the one or more perimeter shield members include one or more non-ferrite materials having a relative magnetic permeability of about 2000 or greater.

Example 13: The electromagnetic shield according to any one of Examples 1-12, wherein the one or more perimeter shield members comprise a material having a relative magnetic permeability of about 2000 or greater.

Example 14: The electromagnetic shield according to any one of Examples 1-12, wherein the one or more shield members comprise a material having a relative magnetic permeability of about 3000 to 4000.

Example 15: The electromagnetic shield according to any one of Examples 1-14, further comprising: a source shield member including a source coil side configured to face one or more source inductive coils; and one or more source perimeter shield members configured in a loop proximate to a perimeter of the source coil side; wherein the source shield member and the one or more source perimeter shield members are configured to shield electromagnetic radiation emitted by the one or more source inductive coils.

Example 16: The electromagnetic shield of Example 15, wherein the one or more perimeter shield members are arranged in an interleaved configuration with respect to the one or more source perimeter shield members while the shield member is positioned in alignment with the source shield member.

Example 17: The electromagnetic shield according to any one of Examples 1-16, wherein the one or more inductive coils comprise a plurality of inductive coils.

Example 18: The electromagnetic shield according to any one of Examples 1-16, wherein the one or more inductive coils comprise a pair of inductive coils.

Example 19: The electromagnetic shield according to any one of Examples 1-16, wherein the one or more inductive coils comprise a single inductive coil.

Example 20: The electromagnetic shield according to any one of Examples 1-19, wherein the shield member is configured to attach to an underside of a vehicle to provide shielding during wireless charging of an energy storage system of the vehicle.

Example 21: A vehicle, comprising: a vehicle coil assembly attached to an underside of the vehicle, the vehicle coil assembly including: one or more vehicle inductive coils configured to receive wireless power from one or more source inductive coils of a source coil assembly; a vehicle shield member between the one or more vehicle inductive coils and the underside of the vehicle; and one or more vehicle perimeter shield members configured in a loop proximate to a perimeter of the vehicle shield member and proximate to a source coil side of the vehicle shield member.

Example 22: The vehicle of Example 21, further comprising an energy storage system operably coupled to the one or more vehicle inductive coils, the energy storage system configured to store the wireless power received from the one or more source inductive coils.

Example 23: The vehicle of Example 22, wherein the energy storage system includes one or more rechargeable batteries.

Example 24: A wireless charging system, comprising: a source coil assembly configured to wirelessly provide power to a vehicle coil assembly of a vehicle, the source coil assembly comprising: a source shield member including a source coil side and a ground side opposite the source coil side; and one or more source perimeter shield members proximate to a perimeter of the source coil side of the source shield member.

Example 25: The wireless charging system of Example 24, wherein the source coil assembly is configured to operably coupled to a power source to deliver power from the power source to the vehicle coil assembly.

Example 26: The wireless charging system according to any one of Examples 24 and 25, wherein the source coil assembly further includes one or more source inductive coils configured to inductively couple with one or more vehicle inductive coils of the vehicle coil assembly.

Example 27: The wireless charging system of Example 26, wherein the one or more source inductive coils comprise two inductive coils arranged in a double D arrangement.

Example 28: The wireless charging system of Example 26, wherein the one or more source inductive coils comprise a single inductive coil.

Example 29: A method of shielding an inductive coil, the method comprising: positioning a shield member adjacent an inductive coil with the inductive coil proximate to a coil side of the shield member; and positioning one or more perimeter shield members extending from the coil side of the shield member proximate to a perimeter of the shield member.

Example 30: A method of wirelessly charging a vehicle, the method comprising: conducting, using one or more source electrical cables, electrical power from a power source to one or more source inductive coils of a source coil assembly positioned beneath a vehicle; radiating wireless power from the one or more source inductive coils to one or more vehicle inductive coils of a vehicle coil assembly attached to an underside of the vehicle; shielding the one or more source inductive coils with a source shield member and one or more source perimeter shield members, the one or more source perimeter shield members configured about a perimeter of the source shield member on a top side of the source shield member; receiving the wireless power radiated from the one or more source inductive coils with one or more vehicle inductive coils; shielding the one or more vehicle inductive coils with a vehicle shield member and one or more vehicle perimeter shield members, the one or more vehicle perimeter shield members configured about a perimeter of the vehicle shield member under a bottom side of the vehicle shield member; and conducting power from the one or more vehicle inductive coils to an energy storage system of the vehicle using one or more vehicle electrical cables.

Example 31: The electromagnetic shield of Example 1, wherein the one or more perimeter shield members are arranged in a continuous loop proximate to the perimeter of the coil side of the shield member.

Example 32: The electromagnetic shield of Example 1, wherein a portion of the shield member extends outward past the one or more shield members at only two lateral sides of the shield member.

Example 33: The electromagnetic shield of Example 1, wherein a portion of the shield member extends outward past the one or more shield members at all sides of the shield member.

Example 34: The electromagnetic shield of Example 1, wherein the one or more perimeter shield members comprise a material having a relative magnetic permeability of substantially 2000 or greater.

Example 35: The wireless charging system of Example 24, wherein the one or more source perimeter shield members are arranged in a discontinuous loop proximate to the perimeter of the source coil side of the source shield member.

Example 36: The wireless charging system of Example 24, wherein the source shield member extends outward past the one or more source perimeter shield members at at least some sides of the source shield member.

Example 37: The wireless charging system of Example 36, wherein the source shield member extends outward past the one or more source perimeter shield members at all sides of the source shield member.

Example 38: The wireless charging system of Example 36, wherein the source shield member extends outward past the one or more source perimeter shield members at only lateral sides of the source shield member corresponding to lateral sides of the vehicle and not past the one or more source perimeter shield members at front and back sides of the source shield member corresponding to a front and a back of the vehicle.

CONCLUSION

As used herein, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used herein and especially in the accompanying claims (e.g., bodies of the accompanying claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following accompanying claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An electromagnetic shield, comprising:
   a shield member including a coil side configured to face one or more inductive coils;
   a plurality of perimeter shield members configured in a loop proximate to a perimeter of the coil side of the shield member;
   a source shield member including a source coil side configured to face one or more source inductive coils; and
   a plurality of source perimeter shield members configured in a loop proximate to a perimeter of the source coil side of the source shield member,
   wherein the plurality of perimeter shield members are arranged in an interleaved configuration with respect to the plurality of source perimeter shield members while the shield member is positioned in alignment with the source shield member,
   wherein the shield member and the plurality of perimeter shield members are configured to shield electromagnetic radiation emitted by the one or more inductive coils, and
   wherein the source shield member and the plurality of source perimeter shield members are configured to shield electromagnetic radiation emitted by the one or more source inductive coils.

2. The electromagnetic shield of claim 1, wherein the plurality of perimeter shield members are distributed in a discontinuous loop proximate to the perimeter of the coil side of the shield member.

3. The electromagnetic shield of claim 1, wherein the plurality of perimeter shield members are arranged in a continuous loop proximate to the perimeter of the coil side of the shield member.

4. The electromagnetic shield of claim 1, wherein the plurality of perimeter shield members are configured at a perimeter edge of the shield member.

5. The electromagnetic shield of claim 1, wherein a portion of the shield member extends outward past the plurality of perimeter shield members and the one or more inductive coils at only two lateral sides of the shield member.

6. The electromagnetic shield of claim 1, wherein a portion of the shield member extends outward past the plurality of perimeter shield members and the one or more inductive coils at all sides of the shield member.

7. The electromagnetic shield of claim 1, wherein the shield member comprises one of aluminum, ferrite, or a mixture including aluminum and ferrite.

8. The electromagnetic shield of claim 1, wherein the plurality of perimeter shield members comprise a material having a relative magnetic permeability of substantially 2000 or greater.

9. The electromagnetic shield of claim 1, wherein the shield member is configured to attach to an underside of a vehicle to provide shielding during wireless charging of an energy storage system of the vehicle.

* * * * *

UNITED STATES PATENT AND TRADEMARK OFFICE
CERTIFICATE OF CORRECTION

| | |
|---|---|
| PATENT NO. | : 12,255,468 B2 |
| APPLICATION NO. | : 17/753536 |
| DATED | : March 18, 2025 |
| INVENTOR(S) | : Bo Zhang and Richard W. Carlson |

Page 1 of 1

It is certified that error appears in the above-identified patent and that said Letters Patent is hereby corrected as shown below:

On the Title Page

In ITEM (54)   Line 2,   change "FOR HIGH POWER WIRELESS CHARGING" to --FOR HIGH-POWER WIRELESS CHARGING--

In the Specification

Column 1,   Line 2,   change "FOR HIGH POWER WIRELESS CHARGING" to --FOR HIGH-POWER WIRELESS CHARGING--

Column 11,   Line 32,   change "FIG. 8). Also by way of" to --FIG. 8). Also, by way of--

Signed and Sealed this
Twenty-ninth Day of July, 2025

Coke Morgan Stewart
*Acting Director of the United States Patent and Trademark Office*